US009166455B2

(12) United States Patent
Ichimonji et al.

(10) Patent No.: US 9,166,455 B2
(45) Date of Patent: Oct. 20, 2015

(54) ROTATING ELECTRICAL MACHINE

(75) Inventors: Masayuki Ichimonji, Tokyo (JP); Toshio Hirano, Kanagawa (JP); Daisuke Murata, Kanagawa (JP); Hitoshi Katayama, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 734 days.

(21) Appl. No.: 13/096,620

(22) Filed: Apr. 28, 2011

(65) Prior Publication Data

US 2011/0266895 A1 Nov. 3, 2011

(30) Foreign Application Priority Data

Apr. 30, 2010 (JP) ................................. 2010-105247

(51) Int. Cl.
*H02K 5/24* (2006.01)
*H02K 1/18* (2006.01)

(52) U.S. Cl.
CPC . *H02K 5/24* (2013.01); *H02K 1/185* (2013.01)

(58) Field of Classification Search
CPC ............ H02K 1/18; H02K 1/185; H02K 5/24
USPC ...................................................... 310/51, 91
See application file for complete search history.

(56) References Cited

U.S. PATENT DOCUMENTS 2,953,697 A * 9/1960 Wall ................................. 310/51
4,152,611 A * 5/1979 Madsen ........................... 310/61
6,144,129 A * 11/2000 Fuller et al. ..................... 310/91
7,045,918 B2 * 5/2006 Jonson ............................ 310/51
2004/0000819 A1 * 1/2004 Jonson ............................ 310/51

FOREIGN PATENT DOCUMENTS

| JP | 55046844 A | * | 4/1980 | ............... H02K 5/24 |
| JP | 04096637 A | * | 3/1992 | ............... H02K 5/24 |
| JP | 05-304742 A | | 11/1993 | |
| JP | 2003-088008 A | | 3/2003 | |
| JP | 2009-225535 A | | 10/2009 | |

OTHER PUBLICATIONS

ITO, JP05304742A Machine Translation, Nov. 1993.*
M. Ichimonji et al., "Reduction of Electro-Magnetic Vibration of Turbine Generator Using Dynamic Damper", Proceding of Dynamic & Design Conference 2010, p. 282 (2010) (in Japanese).

* cited by examiner

*Primary Examiner* — Quyen Leung
*Assistant Examiner* — Eric Johnson
(74) *Attorney, Agent, or Firm* — Foley & Lardner LLP

(57) ABSTRACT

According to one embodiment, a rotating electrical machine has a vibrating-element. The vibrating-element has spring bars and circular members which cover spring bars while a part is connected to spring bars. The spring bars are connected to first stator core connection portions, which are formed so as to be spaced out in a circumferential direction from each other at two locations on a side surface of the stator core. The stator frame is connected by the second stator core connection portions, which are formed by two locations which are different from the first stator core connection portions, of the stator core. The second stator core connection portions contain a position adjacent to a node portion of a circular mode of vibration of the stator core, in which antinodes and nodes of vibration alternately appear in the circumferential direction as the vibrating-element is attached to the stator core.

5 Claims, 23 Drawing Sheets

- W1: The deformation of the stator core at a given time t
- W2: Vibrational distribution of the stator core
- Distribution of displacement of the stator core

ROTATING ELECTRICAL MACHINE

CROSS-REFERENCE TO RELATED APPLICATION

This application is based upon and claims the benefit of priority from Japanese Patent Application No. 2010-105247, filed on Apr. 30, 2010; the entire content of which is incorporated herein by reference.

FIELD

Embodiments described herein relate generally to a rotating electrical machine that vibrates because of electro-magnetic pull force that occurs as a rotor rotates.

BACKGROUND ART

A rotating electrical machine such as a power generator or electric motor includes a rotor, which rotates together with a rotating shaft, and a stator, which is so formed as to surround the rotor from the radial-direction outside. The stator includes a cylindrical stator core, which is so formed as to surround the rotor, and a stator frame, which covers the stator core from the radial direction.

Because of the electro-magnetic pull force that occurs as the rotor rotates, electro-magnetic vibrations occur at the stator. It is necessary to prevent the electro-magnetic vibrations from transmitting to a base on which the rotating electrical machine is placed. As for the stator of a typical rotating electrical machine, an elastic body or the like is placed between the stator core and the stator frame so that the stator core is supported through the elastic body, thereby keeping the electro-magnetic vibrations from transmitting to the outside of the stator frame.

For example, in a 2-pole turbine generator, the electro-magnetic pull force that acts on the rotor vibrates in a circular mode of vibration, which has node portions of vibrations in the circumferential direction. In the 2-pole turbine generator, there are four node portions. The circular mode of vibration moves in the circumferential direction at the same frequency as a rotating speed of the rotor.

Meanwhile, like the electro-magnetic pull force, the stator vibrates in a four-node circular natural mode of vibration. The vibration mode of the stator is substantially the same as the vibration mode of the electro-magnetic pull force of the rotor. Therefore, the stator is excited severely. In this case, as the vibration mode of the electro-magnetic pull force (excitation force) increases, so does the natural mode of vibration of the stator.

The circumferential-direction distribution of the excitation force mode is represented by formula (1) because there are four node portions. In this case, the angle of the circumferential direction is represented by $\theta$, and the magnitude of the electro-magnetic pull force of the rotor by $F_0$.

$$F(\theta) = F_0 \cos(2\theta) \quad (1)$$

Meanwhile, for the circumferential-direction distribution of the circular natural mode of vibration of the stator core, if the number of node portions is n, formula (2) is realized. In this case, the displacement in the circumferential direction is represented by x, and the amplitude thereof by $x_0$.

$$x(\theta) = x_0 \cdot \cos(n \cdot \theta) \quad (2)$$

Accordingly, mode excitation force $F_n$ is represented by formula (3).

$$F_n = (F \cdot x) \quad (3)$$
$$= \int_0^{2\pi} F_0 \cos(2\theta) \cdot x_0 \cos(n \cdot \theta) d\theta$$
$$= \begin{cases} = F_0 \cdot x_0 & (n = 2) \\ = 0 & (n \neq 2) \end{cases}$$

That is, in any cases other than n=4, orthogonality is realized. Accordingly, the mode excitation force comes to zero. Therefore, it is possible to ignore any mode response other than n=4.

The four-node natural circular mode of vibration includes two vibration modes. According to one vibration mode, antinodes of vibration (portions where the amplitude is large) are formed on, for example, a vertical central axis of a rotating-shaft-direction cross-sectional surface of the stator core. According to the other mode, the antinodes of vibration are formed on an axis that is tilted at 45 degrees from the above vertical central axis.

As for the distribution of both vibration modes, the nodes of vibration (where the amplitude becomes zero) are replaced with the antinodes of vibration. That is, at locations where antinodes emerge according to one vibration mode, nodes emerge according to the other vibration mode. Moreover, the natural frequency of one vibration mode is equal to that of the other vibration mode.

In the 2-pole turbine generator, the above four-node natural circular mode of vibration is excited by the excitation force of the rotor having substantially the same four-node circular mode of vibration. In each natural mode of vibration, the positions of nodes remain unchanged. Accordingly, in each mode response, the positions of nodes remain unchanged, and the other portions carry out harmonic vibrations in terms of time so as to be proportional to the shape of modes. Such a form of vibration is called a standing wave.

However, as in the case of the electro-magnetic pull force of the above rotor, the stator has two natural circular modes of vibration; the positions of nodes and antinodes of the vibration modes emerge differently from each other. A vibration mode that occurs on a real stator, which is calculated by superimposing responses of the two vibration modes, is in the same shape as the four-node circular mode of vibration as in the case of the excitation force.

If the vibration mode rotates at an angular speed of the rotor, the magnitude of the amplitude of the stator remains a certain value across the entire circumference. That is, in the response of each natural mode of vibration, there are node portions of vibration. However, in a real response obtained by superimposing the responses of the two vibration modes, no node portion emerges.

In this case, since the amplitude is uniform across the circumferential-direction entire circumference of the stator, it is difficult to prevent the electro-magnetic vibrations that occur at the stator from transmitting to the base on which the rotating electrical machine is placed.

As for a method of suppressing vibrations of the rotating electrical machine's stator caused by the electro-magnetic pull force of the rotor, the following is known, for example, as disclosed in Japanese Patent Application Laid-Open Publications No. 2003-088008, the entire contents of which are incorporated herein by reference, by having a polygonal cross-sectional surface of the stator core, the structural symmetry of the stator breaks, resulting in a reduction in vibration.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION

Figure 1:
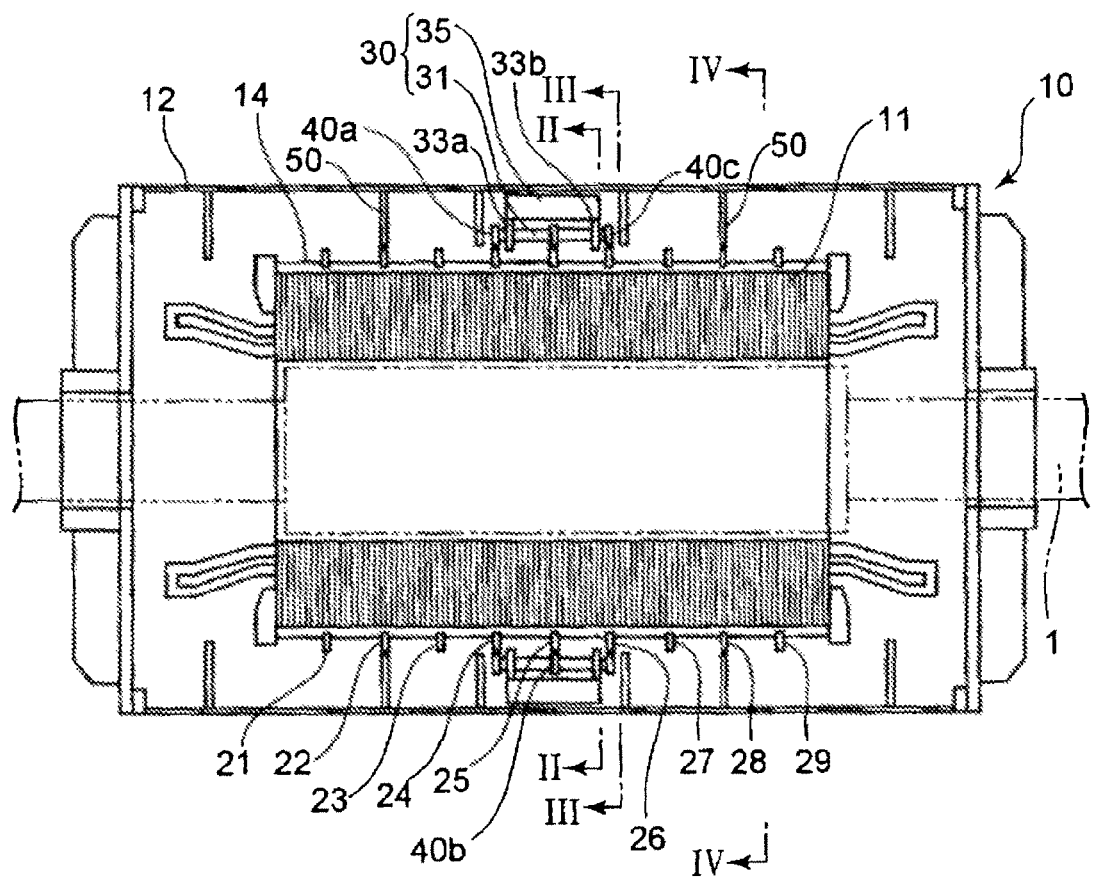
FIG. 1 is a schematic longitudinal cross-sectional view of a first embodiment of a rotating electrical machine according to the present invention.

Even though the stator core of the rotating electrical machine is made by stacking die-cut plates in an axial direction, the shape of the stator core is large in the case of a large rotating electrical machine like a turbine generator. Therefore, it is difficult to mold with one circular die-cut plate. Thus, the stator core is made by dividing a die-cut plate in the circumferential direction at a small angle into sector pieces and stacking the fan-shaped pieces in the axial direction in such a way that the angular difference between the fan-shaped pieces is half an interior angle of the sector pieces.

In this case, a plurality of kinds of die-cut plates' shape is required to make a polygon, making the production process more complicated. Moreover, the external shape of the stator core becomes larger than a circular cross-sectional surface, leading to an increase in the size and weight of the generator's main unit. Therefore, it may be difficult to apply the following measure to a large machine: a polygonal stator core is made to deal with vibrations.

The present invention has been made to solve the above problems. The object of the present invention is to make it possible to curb the vibrations of the rotating electrical machine, which are attributable to electro-magnetic vibrations that occur due to the rotation of the rotor.

According to an embodiment, there is presented a rotating electrical machine, characterized by comprising: a rotor that includes a rotating shaft, which rotates around a predetermined axis, and rotates together with the rotating shaft; a stator core that is substantially in a shape of a hollow cylinder, is made of a plurality of steel plates, which are substantially in a shape of a circular disc and stacked in an axial direction, and is disposed so as to surround an outer circumference of the rotor; a stator frame that is so formed as to cover the stator core from a radial-direction outside in such a way that predetermined radial-direction intervals are maintained on a side surface of the stator; a beam structural member that is connected to first stator core connection portions, which are formed so as to be spaced out in a circumferential direction from each other at least at two locations on a side surface of the stator core, with portions, other than portions connected to the first stator core connection portions, being disposed so as to surround part of the side surface in a circumferential direction from the radial-direction outside in such a way that predetermined radial-direction intervals are maintained on the side surface of the stator core, and is able to elastically deform at least in the radial direction.

There is also presented a rotating electrical machine, characterized by comprising: a rotor that includes a rotating shaft, which rotates around a predetermined axis, and rotates together with the rotating shaft; a stator core that is substantially in a shape of a hollow cylinder, is made of a plurality of steel plates, which are substantially in a shape of a circular disc and stacked in an axial direction, and is disposed so as to surround an outer circumference of the rotor; a stator frame that is so formed as to cover the stator core from a radial-direction outside in such a way that predetermined radial-direction intervals are maintained on a side surface of the stator; and a beam structural member that is connected to frame connection portions, which are formed so as to be spaced out in a circumferential direction from each other at least at two locations on an outer surface of the stator frame, with portions, other than portions connected to the frame connection portions, being disposed so as to surround part of the outer surface in circumferential direction from the radial-direction outside in such a way that predetermined radial-direction intervals are maintained on the outer surface of the stator frame, and is able to elastically deform at least in the radial direction.

There is also presented a rotating electrical machine, characterized by comprising: a rotor that includes a rotating shaft, which rotates around a predetermined axis, and rotates together with the rotating shaft; a stator core that is substantially in the shape of a hollow cylinder, is made of a plurality of steel plates, which are substantially in the shape of a circular disc and stacked in an axial direction, and is disposed so as to surround an outer circumference of the rotor; a stator frame that is so formed as to cover the stator core from a radial-direction outside in such a way that predetermined radial-direction intervals are maintained on a side surface of the stator; and a beam structural member that is connected to frame connection portions, which are formed so as to be spaced out in a circumferential direction from each other at least at two locations on an inner surface of the stator frame, with portions, other than the portions connected to the frame connection portions, being disposed so that part of the inner surface goes along radial-direction inside in the circumferential direction in such a way that predetermined radial-direction intervals are maintained on the inner surface of the stator frame, and is able to elastically deform at least in the radial direction.

Hereinafter, embodiments of rotating electrical machines of the present invention will be described with reference to the accompanying drawings.

First Embodiment

A first embodiment of a rotating electrical machine of the present invention will be described with the use of FIGS. 1 to 14.

Figure 2:
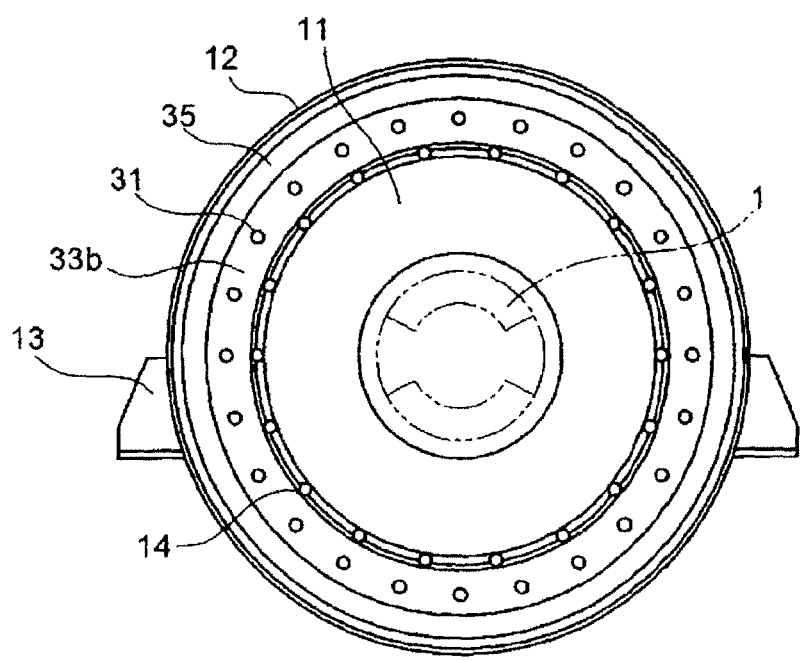
FIG. 2 is a schematic transverse cross-sectional view of FIG. 1 taken along II-II.
Figure 3:
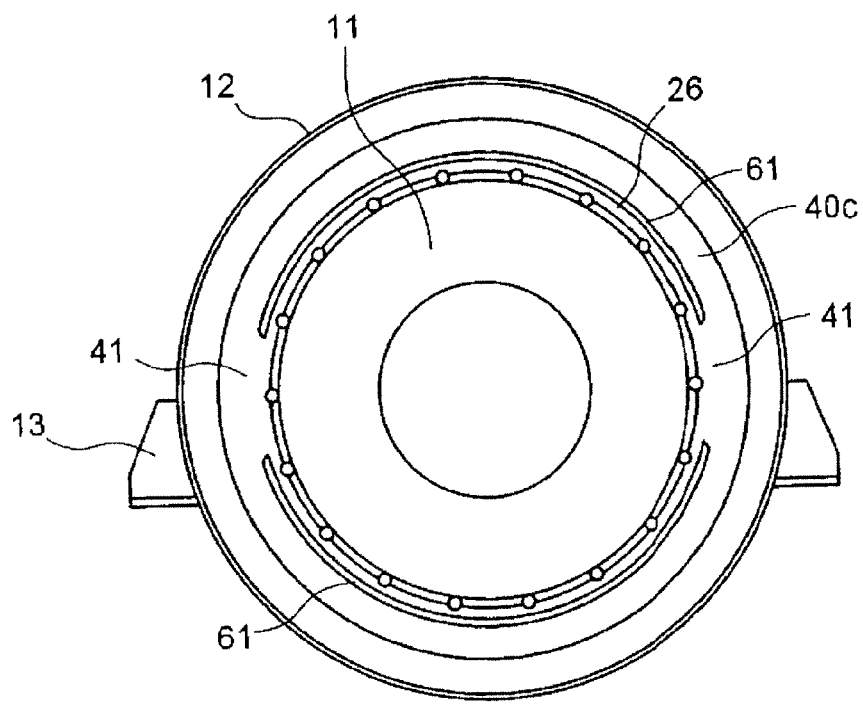
FIG. 3 is a schematic transverse cross-sectional view of FIG. 1 taken along III-III.
Figure 4:
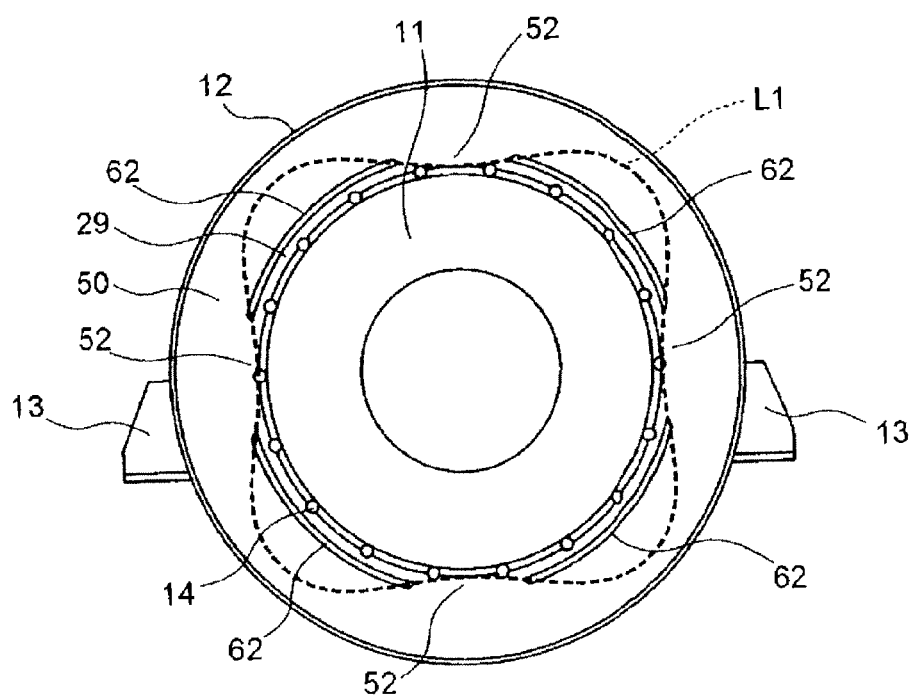
FIG. 4 is a schematic transverse cross-sectional view of FIG. 1 taken along IV-IV.

FIG. 1 is a schematic longitudinal cross-sectional view of a rotating electrical machine according to the present embodiment. FIG. 2 is a schematic cross-sectional view of FIG. 1 taken along II-II. FIG. 3 is a schematic cross-sectional view of FIG. 1 taken along III-III. FIG. 4 is a schematic cross-sectional view of FIG. 1 taken along IV-IV. Incidentally, in FIGS. 3 and 4, a rotor 1 is not shown.

Figure 5:
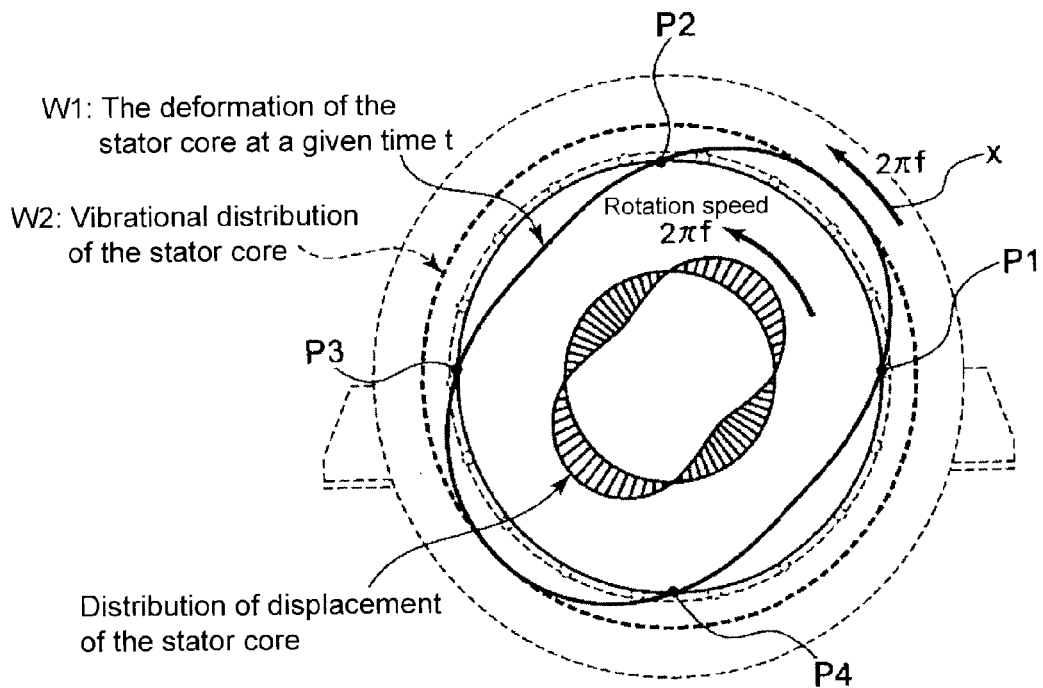
FIG. 5 is a model diagram schematically illustrating a relationship between electro-magnetic pull force of a rotor at a time when the rotor shown in FIG. 1 is rotating and the amplitude of vibration of a stator.
Figure 6:
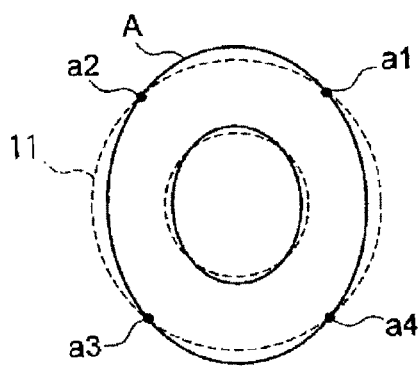
FIG. 6 is a model diagram illustrating a form of a first natural circular mode of vibration (first mode) of a stator core shown in FIG. 1.
Figure 7:
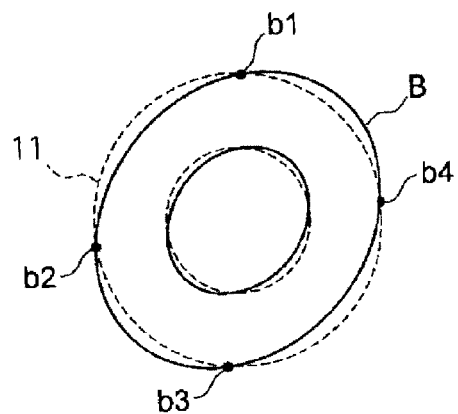
FIG. 7 is a model diagram illustrating a form of a first natural circular mode of vibration (second mode) of the stator core shown in FIG. 1.

FIG. 5 is a model diagram schematically illustrating a relationship between electro-magnetic pull force of a rotor at a time when the rotor 1 shown in FIG. 1 is rotating and the amplitude of vibration of a stator 10. FIG. 6 is a model diagram illustrating a form of a first natural circular mode of vibration (first mode) of a stator core 11 shown in FIG. 1. FIG. 7 is a model diagram illustrating a form of a second natural circular mode of vibration (second mode) of the stator core 11 shown in FIG. 1.

Figure 8:
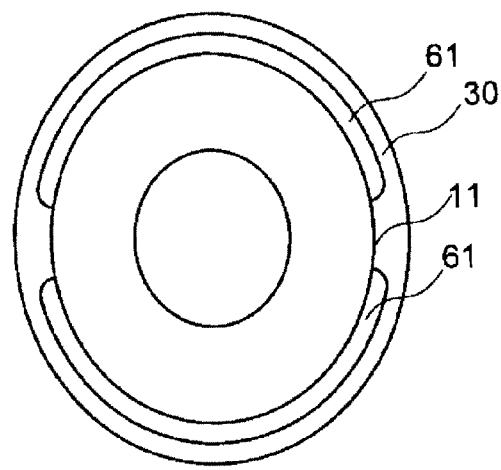
FIG. 8 is a model diagram schematically illustrating a form of the first mode of the stator shown in FIG. 1, showing an in-phase mode in which the stator core and a vibrating element deform in the same direction.
Figure 9:
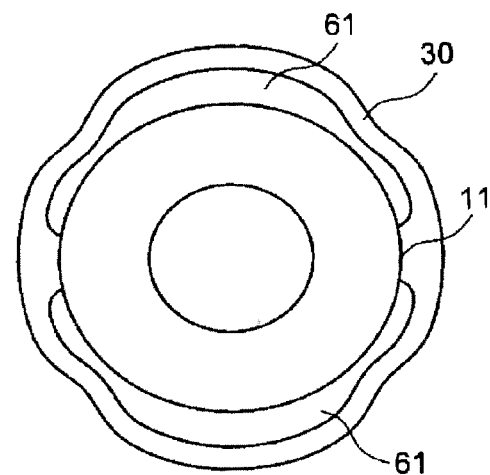
FIG. 9 is a model diagram schematically illustrating a form of the first mode of the stator shown in FIG. 1, showing a reverse-phase mode in which the stator core and the vibrating element deform in opposite directions.

FIG. 8 is a model diagram schematically illustrating a form of the first mode of the stator 10 shown in FIG. 1, showing an in-phase mode in which the stator core 11 and a vibrating element 30 deform in the same direction. FIG. 9 is a model diagram schematically illustrating a form of the first mode of the stator 10 shown in FIG. 1, showing a reverse-phase mode in which the stator core 11 and the vibrating element 30 deform in opposite directions.

Figure 10:
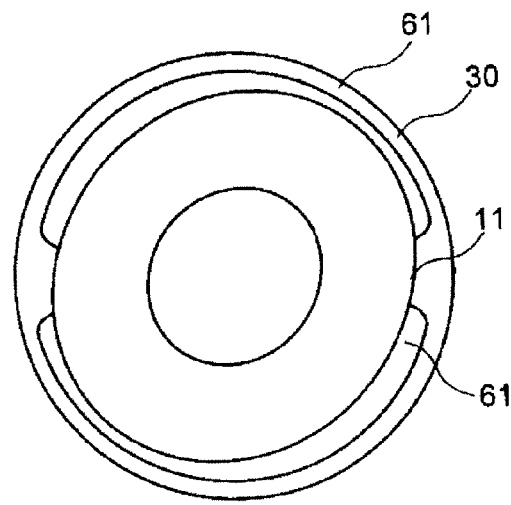
FIG. 10 is a model diagram schematically illustrating a form of the second mode of the stator shown in FIG. 1.
Figure 11:
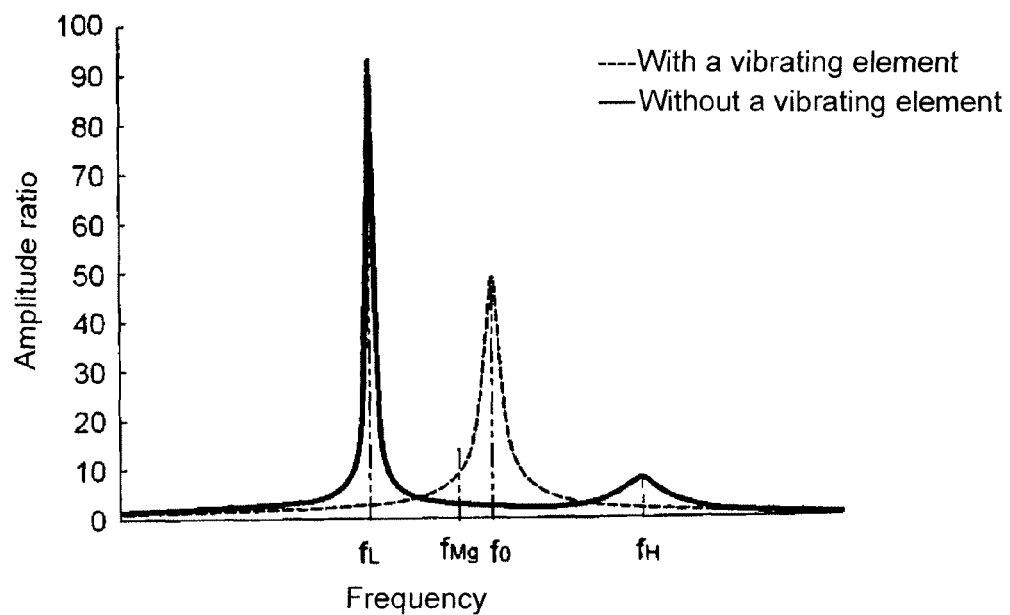
FIG. 11 is a graph showing a frequency characteristic of the amplitude of vibration of the stator shown in FIG. 1, or a frequency response diagrammatic drawing showing a difference in the response of the first mode between when the vibrating element exists and when the vibrating element does not exist.

FIG. 10 is a model diagram schematically illustrating a form of the second mode of a system combining the stator core 11 of the rotating electrical machine shown in FIG. 1 and the vibrating element 30. FIG. 11 is a graph showing a frequency characteristic of the amplitude of vibration of the stator 10 shown in FIG. 1, which, as a frequency response diagrammatic drawing, shows a difference in the response of the first mode between when the vibrating element 30 exists and when the vibrating element 30 does not exist.

Figure 12:
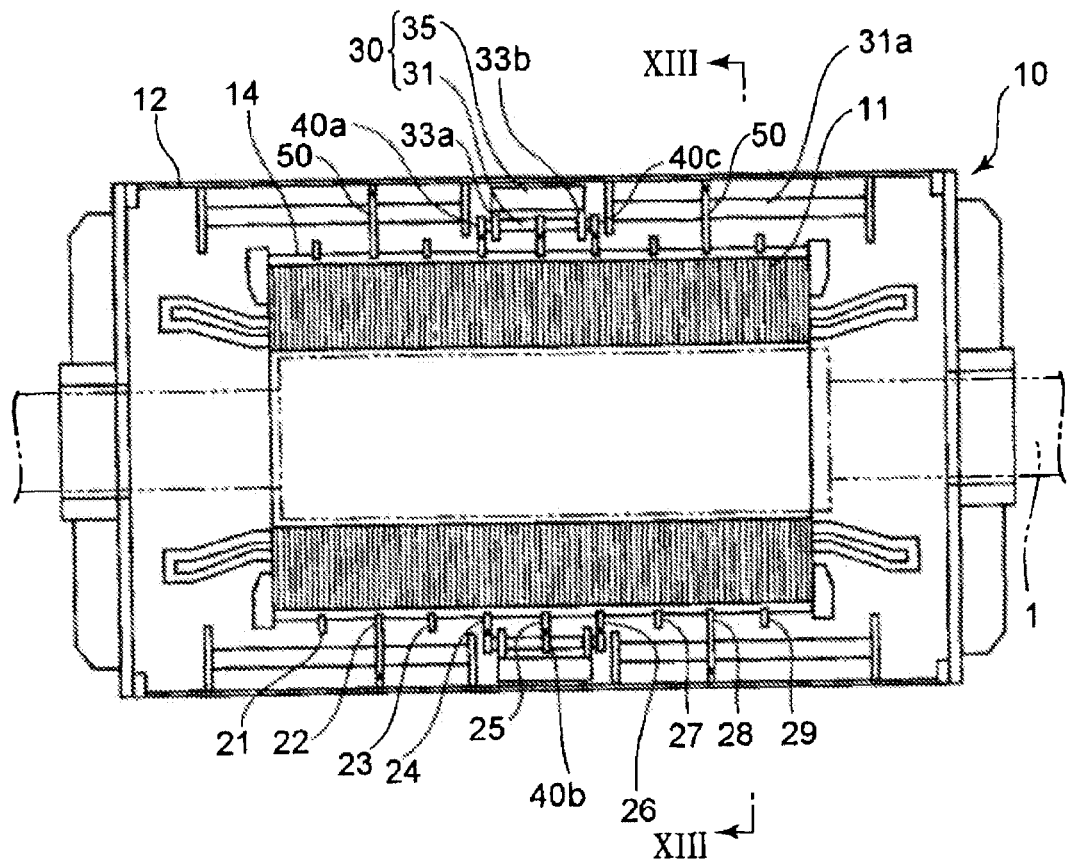
FIG. 12 is a schematic longitudinal cross-sectional view showing an alternative example of the embodiment shown in FIG. 1.

FIG. 12 is a schematic transverse cross-sectional view showing an alternative example of the embodiment shown in FIG. 1. Incidentally, in FIG. 12, the rotor 1 is not shown.

First, the configuration of the rotating electrical machine of the present embodiment will be described.

The rotating electrical machine includes the rotor 1, which includes a horizontal rotating shaft, and the stator 10, which surrounds the rotor 1 from the radial-direction outside. The stator 10 includes the stator core 11 and a stator frame 12, which surrounds the stator core 11 from the radial-direction outside. On the outside of the stator frame 12, a leg portion 13 (FIG. 2) is provided: the leg portion 13 is connected to a base on which the rotating electrical machine is placed.

The stator core 11 has a plurality of steel plates, which are substantially in the shape of a circular disc with a hole being formed on the center. The steel plates are so disposed as to surround the rotor 1 from the radial-direction outside and are stacked in an axial direction. In this manner, the stator core 11 is formed.

On an outer circumference surface of the stator core 11, a plurality of rib bars 14 extending in the axial direction are spaced out in a circumferential direction from each other and attached so as to run parallel. The rib bars 14 each extend from an axial-direction end portion of the stator core 11 to the other end portion.

According to the present embodiment, on a radial-direction inside of the stator frame 12 on the radial-direction outside of the stator core 11, nine stator core rib plates, a plurality of spring bars 31, a circular member 35 and the like are disposed. The following describes the configuration of the above members and the like.

What is disposed on the radial-direction outsides of the rib bars 14 is nine stator core rib plates to fix the rib bars 14: a first stator core rib plate 21, a second stator core rib plate 22, a third stator core rib plate 23, a fourth stator core rib plate 24, a fifth stator core rib plate 25, a sixth stator core rib plate 26, a seventh stator core rib plate 27, an eighth stator core rib plate 28, and a ninth stator core rib plate 29.

The first to ninth stator core rib plates 21 to 29 each have an opening at the center and are in the shape of a circular disc on which a hole is made, with a surface being formed so as to extend in the radial direction on the radial-direction outside of the opening. The first to ninth stator core rib plates 21 to 29 are so arranged as to be evenly spaced out from each other in the axial direction. According to the present embodiment, the first to ninth stator core rib plates 21 to 29 are arranged in the following order from left to right in the case of FIG. 1: the first stator core rib plate 21, the second stator core rib plate 22, the third stator core rib plate 23, the fourth stator core rib plate 24, the fifth stator core rib plate 25, the sixth stator core rib plate 26, the seventh stator core rib plate 27, the eighth stator core rib plate 28, and the ninth stator core rib plate 29.

The first to ninth stator core rib plates 21 to 29 are so disposed that the rib bar 14 and the stator core 11 exist in each opening. With the insides of the openings being in contact with the outside of each rib bar 14, each rib bar 14 is fixed on the stator core 11.

A plurality of spring bars 31 are in the shape of a bar, extending in the axial direction. The spring bars 31 are disposed, around the axial-direction center of the stator core 11 and on the radial-direction outside of the stator core rib plate, so as to be spaced out at predetermined intervals in the radial direction and run parallel to each other. In the present example, 24 bars are arranged along the circumferential direction (FIG. 2). The spring bars 31 are so formed as to be able to deform elastically in the radial direction.

The spring bars 31 stretch over the fourth to sixth stator core rib plates 24 to 26. That is, the spring bars 31 are so formed that both ends of each spring bar 31 are on the radial-direction outside of the fourth stator core rib plate 24 and on the radial-direction outside of the sixth stator core rib plate 26.

On the radial-direction outsides of the fourth to sixth stator core rib plates 24 to 26, a first spring bar attachment portion 40a, a second spring bar attachment portion 40b and a third spring bar attachment portion 40c are integrally formed to fix the spring bars 31. The first to third spring bar attachment portions 40a to 40c cover the fourth to sixth stator core rib plates 24 to 26 from the radial-direction outside across the entire circumference and are in the shape of a plate on which a surface is so formed as to extend in the radial direction. One end portion of each spring bar 31 (the left end portion in the case of FIG. 1) is attached to a surface that is formed on the fourth stator core rib plate 24 so as to extend in the radial direction of the first spring bar attachment portion 40a. The other end portion of each spring bar 31 (the right end portion in the case of FIG. 1) is attached to the surface of the third spring bar attachment portion 40c of the sixth stator core rib plate 26. Each spring bar 31 is fixed so as to pierce through a surface extending in the radial direction of the second spring bar attachment portion 40b of the fifth stator core rib plate 25.

The first to third spring bar attachment portions 40a to 40c are each connected to the fourth to sixth stator core rib plates 24 to 26 at predetermined circumferential-direction positions. As for the other parts, the radial-direction intervals remain spaced out. Circumferential-direction positions that serve as connection portions, i.e. first stator core connection portions 41 (FIG. 3), are formed at two locations (in the right and left areas of the diagram), which are positioned substantially at the same height as the rotating center of the rotating shaft. As shown in FIG. 3, the radial-direction intervals are half-circle arc through holes 61, which run in the circumferential direction and are about less than half the circumference of the circle in length; the half-circle arc through holes 61 are formed at two locations in an upper area and a lower area of FIG. 3 so as to contain the center of the rotating shaft and be symmetrical about a line, which is a horizontal line running perpendicularly to the center of the shaft. That is, the fourth to sixth stator core rib plates 24 to 26 are plate-like members on which two half-circle arc through holes 61 are formed. Positions where the first stator core connection portions 41 are formed will be described later.

The circular member 35 is disposed on the radial-direction outside of each spring bar 31. In the example shown in FIG. 1, the circular member 35 is a hollow cylindrical member whose axial-direction length is shorter than the axial-direction length of each spring bar 31.

The circular member 35 is connected to each spring bar 31 through two circular attachment plates, i.e. a first circular attachment plate 33a and a second circular attachment plate 33b.

The first circular attachment plate 33a is a circular disc on which a hole is made; the first circular attachment plate 33a is disposed between the fourth stator core rib plate 24 and the fifth stator core rib plate 25 so as to be closer to the fourth stator core rib plate 24. The second circular attachment plate 33b is a circular disc on which a hole is made; the second circular attachment plate 33b is disposed between the fifth stator core rib plate 25 and the sixth stator core rib plate 26 so as to be closer to the sixth stator core rib plate 26.

The first circular attachment plate 33a and the second circular attachment plate 33b each fix each spring bar 31 in such a way that each spring bar 31 passes therethrough. Moreover, the first and second circular attachment plates 33a and 33b each fix the circular member 35 so that the circular member 35 does not interfere with the first to third spring bar attachment portion 40a to 40c formed on the fourth to sixth stator core rib plates 24 to 26, i.e. that the inner circumference side of the circular member 35 is on the radial-direction outside of each of the fourth to sixth stator core rib plates 24 to 26. The mass of the circular member 35 and other details will be described later.

The spring bars 31 and the circular member 35 make up the vibrating element 30. The operation of the vibrating element 30 will be described later.

On the radial-direction outside of the second stator core rib plate 22 and on the radial-direction outside of the eighth stator core rib plate 28, stator frame connection portions 50 are integrally formed. The radial-direction outsides of the stator frame connection portions 50 are connected to the inside of the stator frame 12.

The stator frame connection portions 50 are connected to the second and eighth stator core rib plates and 28 at predetermined circumferential-direction positions. As for the other parts, the radial-direction intervals remain spaced out. Circumferential-direction positions that serve as connection portions, i.e. second stator core connection portions 52 (FIG. 4), are formed at two locations, which are positioned substantially at the same height as the rotating center of the rotating shaft, as well as two locations in an upper area and a lower area (vertical direction), totaling four locations. As shown in FIG. 4, the radial-direction intervals are partial circular-arc through holes 62, which run in the circumferential direction and are formed at four locations and about less than a quarter of the circumference of the circle in length. That is, the second and eighth stator core rib plates 22 and 28 are plate-like members on which four partial circular-arc through holes 62 are formed. Positions where the second stator core connection portions 52 are formed will be described later.

The following describes the operation of the present embodiment.

In the case of a 2-pole turbine generator, the electro-magnetic pull force that acts on the inner circumference of the stator core 11 from the rotor 1 forms an elliptical circular mode of vibration, which has four node portions (Points P1, P2, P3 and P4 in the diagram) as shown in FIG. 5. Moreover, as the rotor 1 rotates, the electro-magnetic pull force rotates and moves in a direction indicated by arrow X.

At this time, the travelling angular velocity is $2\pi f$[rad/s] when the rotation speed of the rotor 1 is represented by f[Hz]. However, the distribution of the electro-magnetic pull force is in the shape of an ellipse. Therefore, vibration frequency $f_{MG}$ of the electro-magnetic force that acts on the stator core 11 is 2f [Hz].

As described above, in the 2-pole turbine generator, what is excited by the electro-magnetic pull force of the rotor 1 is the circular natural mode of vibration having four nodes; any other natural modes of vibration are not excited.

When the vibrating element 30 is not attached, the four-node circular natural mode of vibration of the stator core 11 includes two circular natural modes of vibration, i.e. the first and the second modes.

As for the first mode, as indicated by curved line A in FIG. 6, one main axis (a short axis in FIG. 6) of an elliptical ring is substantially aligned with a horizontal axis. Therefore, as for the second mode, as indicated by curved line B in FIG. 7, a main axis, which is for example a long axis, makes an angle of about 45 degrees with the horizontal axis.

As indicated by four points, a1, a2, a3 and a4, on the first mode shown in FIG. 6, there are four node potions where the amplitude is zero. The circumferential-direction amplitude distribution in the electro-magnetic vibration that vibrates in the radial direction is formed in such a way that node and antinode portions alternately occur in the circumferential direction. The second mode has almost the same natural frequency as the first mode does. As indicated by four points, b1, b2, b3 and b4, on the second mode shown in FIG. 7, there are four node portions where the amplitude is zero. The second mode is formed so as to be substantially in the same shape as the first mode, with the long axes making an angle of 45 degrees with each other.

According to the configuration of a typical power generator, the position of a node portion of the first mode is substantially the same as the position of an antinode portion of the second mode; the position of a node portion of the second mode is substantially the same as the position of an antinode portion of the first mode. Moreover, the natural frequency corresponding to the first mode is substantially equal to the natural frequency corresponding to the second mode. Even though the first and the second modes are standing waves, the first and the second modes play complementary roles in such a way that node and antinode portions appear differently from each other. Therefore, no node portion appears when both modes are superimposed.

When the rotational electro-magnetic force, which is in the shape of an ellipse, acts on the stator core 11 due to the characteristic of the circular natural mode of vibration, the natural modes of vibration of the first and second modes are evenly excited. Therefore, after the response vibration modes of the first and second modes are combined, identical vibration amplitudes emerge across the entire circumference of the stator core 11.

Look at displacements over time as to the deformation of the stator core 11 caused by the above. The deformation of the stator core 11 at a given time t takes a form of a circular mode of vibration that has four node portions (P1 to P4) as in the case of the form of the electro-magnetic excitation force, as indicated by solid line W1 in FIG. 5. When the rotor 1 is rotating, the deformed shape of the four-node circular mode of vibration of the stator core 11 rotates and moves at a velocity of $2\pi f$[rad/s] in synchronization with the rotating and traveling of the electro-magnetic excitation force. Therefore, the vibration amplitude of the stator core 11 takes a constant value across the entire circumference as indicated by dotted line W2 in FIG. 5. That is, on the stator 10 of the rotating electrical machine, what appears is a form of vibration that does not have a node portion, which is different from a standing wave.

In general, when, to a certain structure (main system), a vibrating element (dependent system) having a different mass and a spring is attached, the natural frequency of the original structure changes. According to the present embodiment, the vibrating element 30, which is a dependent system, is attached to the stator core 11, which is a main system, on the first stator core connection portions 41 at two locations, which are positioned substantially at the same height as the rotating center of the rotating shaft. In a system where the stator core 11 and the vibrating element 30 are combined, depending on the phase relationship of a displacement of the circular member 35 relative to a displacement of the stator core 11 corresponding to the first mode of the stator core 11, two natural modes of vibration, i.e. the in-phase mode and the reverse-phase mode, emerge.

As for the natural mode of vibration of the in-phase mode, the directions of the displacement of the circular member 35 are the same with respect to the deformation of the first mode of the stator core 11. Accordingly, in the in-phase mode, as shown in FIG. 8, both the stator core 11 and the circular member 35 deform in such a way that the stator core 11 and the circular member 35 expand or contract in the vertical direction shown in the diagram.

Meanwhile, as for the natural mode of vibration of the reverse-phase mode, the directions of the displacement of the circular member 35 are opposite to each other with respect to the first mode of the stator core 11. Accordingly, in the reverse-phase mode, as shown in FIG. 9, the stator core 11 deforms in such a way that the stator core 11 expands or contracts in the horizontal direction shown in the diagram, while the circular member 35 deforms in such a way that the circular member 35 expands or contracts in the vertical direction.

At this time, the natural frequency of the in-phase mode goes below the original natural frequency (the natural frequency of the first mode); the natural frequency of the reverse-phase mode goes above the original natural frequency. To establish the relationship shown in formula (4) between the natural frequency $f_L$ of a low-order in-phase mode, the natural frequency $f_H$ of a high-order reverse-phase mode, and the vibration frequency $f_{MG}$ (equal to double the frequency of power supply) of the electro-magnetic excitation force caused by the electro-magnetic pull force of the rotor 1, the vibrating element 30 is designed by making adjustments to the shape, structure, configuration and material of the circular member 35, as well as to the shape, rigidity and other factors of the spring bars 31.

$$f_L < f_{Mg} < f_H \qquad (4)$$

Meanwhile, the vibrating element 30 is connected at a position corresponding to a node portion of the second mode of the stator core 11, i.e. at the first stator core connection portion 41. Accordingly, the vibrating element 30 does not affect the second mode. Thus, even in the system where the stator core 11 and the vibrating element 30 are combined, the second mode turns out to be a circular mode of vibration whose main axis makes an angle of about 45 degrees with the horizontal axis, i.e. a mode that deforms so as expand or contract obliquely as shown in FIG. 10.

Therefore, the natural frequency of the second mode remains almost unchanged, and the separation of the natural frequency does not take place. Thus, as for the natural mode of vibration of the second mode, only the form shown in FIG. 10 occurs.

With respect to the stator core 11, the vibrating element 30 is connected to a portion corresponding to an antinode portion of the vibration of the first mode of the four-node circular mode of vibration of the stator core 11. That is, the first stator core connection portions 41 of the fourth to sixth stator core rib plates 24 to 26 are each formed at positions corresponding to antinode portions of the vibration of the first mode of the stator core 11. Therefore, the natural frequency of the first mode of the four-node circular mode of vibration of the stator core 11 is divided into low-order $f_L$ and high-order $f_H$, with the vibration frequency $f_{MG}$ of the electro-magnetic excitation force therebetween.

The vibration response of the structure, which is caused by the excitation force, can be calculated by superimposing the vibration responses of the respective natural modes of vibration. In the case of the electro-magnetic excitation force, only the four-node circular mode of vibration is excited. Therefore, the vibration response of the stator 10 can be calculated by adding up the responses of three circular natural modes of vibration, which are schematically shown in FIGS. 8 to 10.

The response in the circular natural mode of vibration is calculated by multiplying the circular natural mode of vibration by: the magnitude of the excitation force, the natural frequency, the excitation frequency, and the response sensitivity, which is provided as a function of an attenuation rate. The form of a displacement of the response is the same as that of the natural mode of vibration. That is, the response of the stator 10 is calculated by multiplying each circular natural mode of vibration by a coefficient and adding up the resultant values.

When the relationship of formula (4) is true, it is assumed that the vibration response in the first mode also deforms in the forms shown in FIGS. 8 and 9. To be exact, the magnitude of the displacement depends on the response sensitivity. However, the general deformation may be based on the above idea.

That is, in the first mode, in response to the low-order natural mode of vibration, the vibration response of the form shown in FIG. 8 occurs; in response to the high-order natural mode of vibration, the vibration response of the form shown in FIG. 9 appears. At this time, as for the displacement of the stator core 11, the low-order natural mode of vibration and the high-order natural mode of vibration are in the reverse-phase relationship to each other; the displacement of the circular member 35 is in the in-phase relationship.

When the responses of the two circular modes of vibration are superimposed, the displacement of the stator core 11 decreases since the reverse-phase displacement is added up. In theory, the displacement of the stator core 11 can be zero. Meanwhile, the response of the circular member 35 has substantially doubled because the in-phase displacement is superimposed. Thus, the response of the first mode curbs the displacement of the stator core 11.

The amplitude of the stator core 11 shows a maximum value at the original natural frequency (f0), as indicated by dotted line in FIG. 11, when there is no vibrating element 30. At this time, the amplitude ratio at the electro-magnetic excitation frequency ($f_{MG}$) is about 10. On the other hand, it is clear that since the vibrating element 30 is provided, local maximum values appear at two separated natural frequencies ($f_L$ and $f_H$), as indicated by solid line in FIG. 11, as for the amplitude of the stator core 11, while the response decreases therebetween. In this case, the amplitude ratio at the electro-magnetic excitation frequency ($f_{MG}$) is less than or equal to 2. In this manner, when the vibrating element 30 is attached to the stator core 11, it is possible to reduce the vibration response of the first mode that occurs at the stator core 11 due to the electro-magnetic excitation force.

Meanwhile, the separation of the natural frequency does not take place in the second mode. Therefore, only a single mode shown in FIG. 10 exists. Thus, a mode response occurs in the form shown in FIG. 10 for the electro-magnetic excitation force.

That is, as for the circular natural mode of vibration of the stator core 11, the response of the first mode decreases, while only the response of the second mode is left behind. The second mode has four node portions, and the response of the second mode is therefore a standing wave. Thus, the amplitude that occurs at the stator core 11 forms the distribution indicated by dotted line L1 in FIG. 4.

The stator frame connection portions 50 connect the stator core 11 and the stator frame 12 at four node portions of the second mode. That is, as shown in FIG. 4, the second stator core connection portions 52 of the second and eighth stator core rib plates 22 and 28 are each formed at positions corresponding to node portions of vibration of the second mode of the stator core 11. As described above, the response of the stator core 11 caused by electro-magnetic excitation force is a standing wave that vibrates in the form of the second mode; the amplitude is small at the node portions of the second mode. Therefore, thanks to the second stator core connection portions 52, it is possible to curb the vibration transmitting from the stator core 11 to the stator frame 12.

Therefore, it is possible to prevent the vibration from transmitting to the base, on which rotating electrical machine is placed, via the leg portion 13 that is provided on the stator frame 12.

Incidentally, the state of the connection of the stator core 11 shown in FIG. 4 to the stator frame 12, i.e. the second and eighth stator core rib plates 22 and 28 on which the second stator core connection portions 52 are formed, is of a core supporting type, which is employed by a relatively low-capacity turbine generator.

Figure 13:
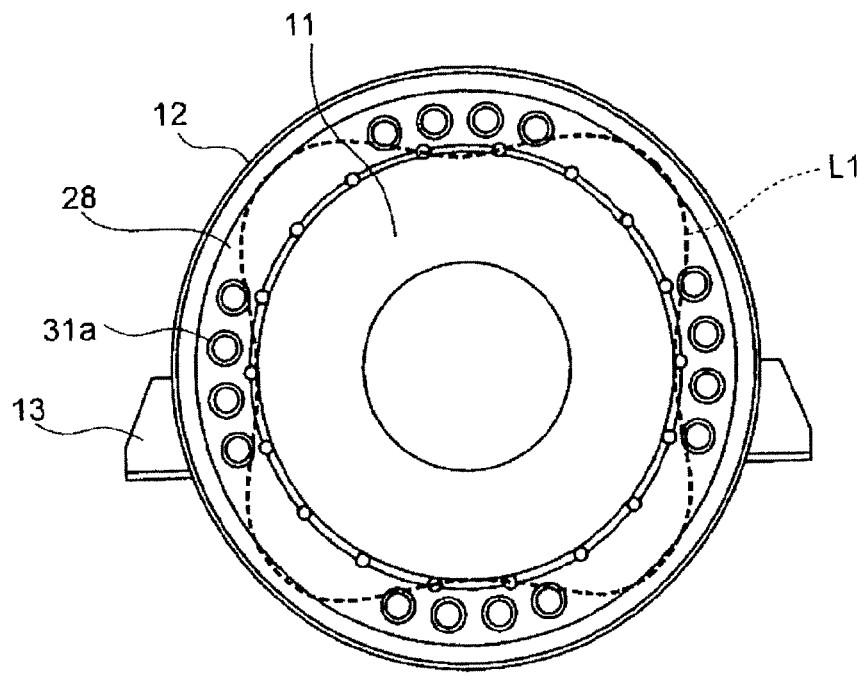
FIG. 13 is a schematic transverse cross-sectional view of FIG. 12 taken along XIII-XIII.

In a high-capacity turbine generator, a stator core rib plate is connected to an elastic beam member that is provided on a rib plate connecting the stator core 11 and the stator frame 12; the stator core 11 is elastically supported with the use of flexural rigidity of the beam member. For example, when the above is applied to a 2-pole turbine generator, as shown in FIGS. 12 and 13, four second spring bars 31a are intensively disposed at each of four locations in the horizontal and the vertical direction that face each other. In this manner, the stator core 11 and the stator frame 12 are connected.

Figure 14:
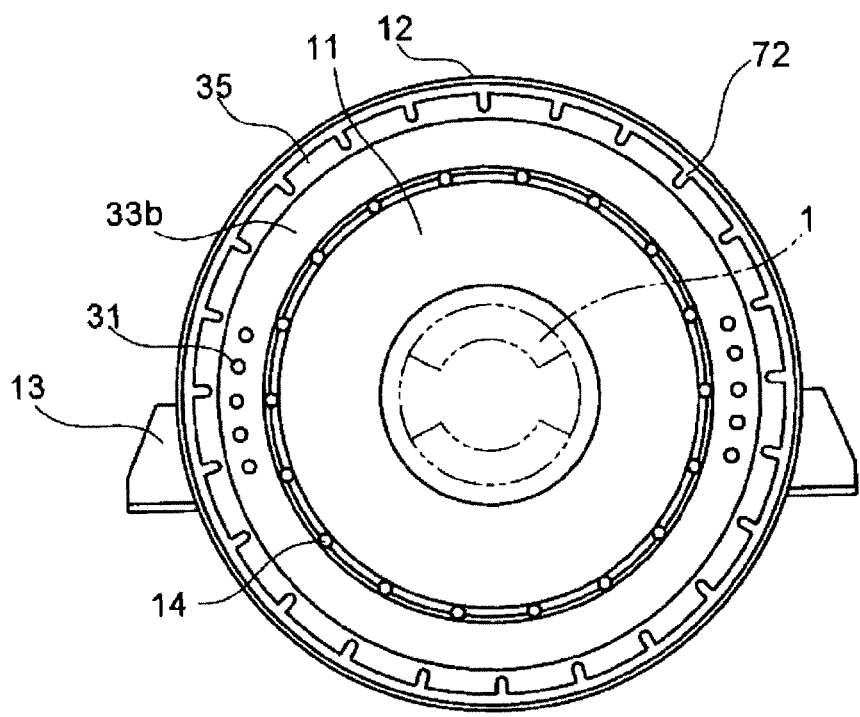
FIG. 14 is a schematic transverse cross-sectional view showing an alternative example of the embodiment shown in FIG. 1.

Moreover, as shown in FIG. 14, the spring bars 31, which make up the vibrating element 30, may be intensively disposed on the radial-direction outsides of the first stator core connection portions 41. In the example shown in FIG. 14, five spring bars 31 are each disposed at positions corresponding to the first stator core connection portions 41. In this case, as for the first to third spring bar attachment portions 40a to 40c, all that is required is to connect portions (two locations) of the first stator core connection portions 41 with respect to the circumferential direction. Moreover, the following is also possible: grooves 72 are provided on the outer circumference of the circular member 35, and the mass of the circular member 35 is adjusted by ejecting or inserting a rod member or the like from or into the grooves 72.

Second Embodiment

Figure 15:
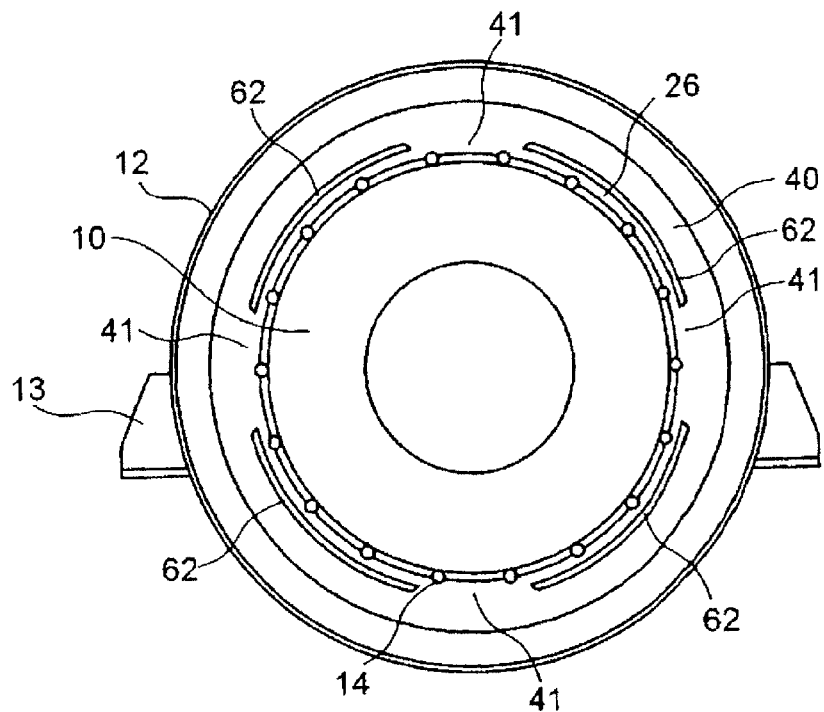
FIG. 15 is a schematic transverse cross-sectional view of a second embodiment of a rotating electrical machine of the present invention.

A second embodiment of a rotating electrical machine of the present invention will be described with the use of FIGS. 6 and 15. FIG. 15 is a schematic transverse cross-sectional view of a rotating electrical machine of the present embodiment. Incidentally, in FIG. 15, the rotor 1 is not shown.

The present embodiment is an alternative example of the first embodiment (FIGS. 1 to 14). The portions that are the same as or similar to those of the first embodiment are represented by the same reference symbols and will not be described again.

In the rotating electrical machine of the present embodiment, the first stator core connection portions 41 formed on the fourth to sixth stator core rib plates 24 to 26 are each formed at one location in each of the upper, lower, left and right areas shown in FIG. 15. That is, the first stator core connection portions 41 are formed at two locations, which are positioned at the same height as the rotating center of the rotating shaft, as well as at two locations in the upper and lower areas (vertical direction), totaling four locations. At portions that are the same in radial-direction position excluding the first stator core connection portions 41, partial circular-arc through holes 62, which are about less than a quarter of the circumference of the circle in length, are formed. That is, the fourth to sixth stator core rib plates 24 to 26 are plate-like members on which four partial circular-arc through holes 62 are formed.

The portions that connect the stator core 11 and the vibrating element 30, i.e. the first stator core connection portions 41, have increased in number. Therefore, the inertial force of the vibrating element 30, which acts on the stator core 11, becomes larger than that of the first embodiment.

As shown in FIG. 6, which is described in the first embodiment, in the first mode of the four-node circular mode of vibration, antinode portions of vibration exist in the vertical direction in a similar way to those in the horizontal direction. In FIG. 6, the horizontal-direction antinode portions are between a1 and a4, and the vertical-direction antinode portions between a2 and a3.

When the vibrating element 30 vibrates in the form of the circular mode of vibration, the inertial force occurs in proportion to the mass of the vibrating element 30. The vibrating element 30 is connected to the stator core 11 at an antinode portion where the amplitude is large. Therefore, the inertial force of the vibrating element 30, which acts on the stator core 11, is transmitted, resulting in the separation of the natural frequency.

Accordingly, as the connection portions increase in number, the inertial force of the vibrating element 30 that is transmitted to the stator core 11 increases. Therefore, it is possible to reduce the mass of the vibrating element 30 and make the vibrating element 30 smaller.

Moreover, when the present invention is applied to a 4-pole turbine generator, the number of nodes of the circular mode of vibration of the electro-magnetic excitation force is 8. Therefore, the configuration of the present embodiment can be employed.

Third Embodiment

Figure 16:
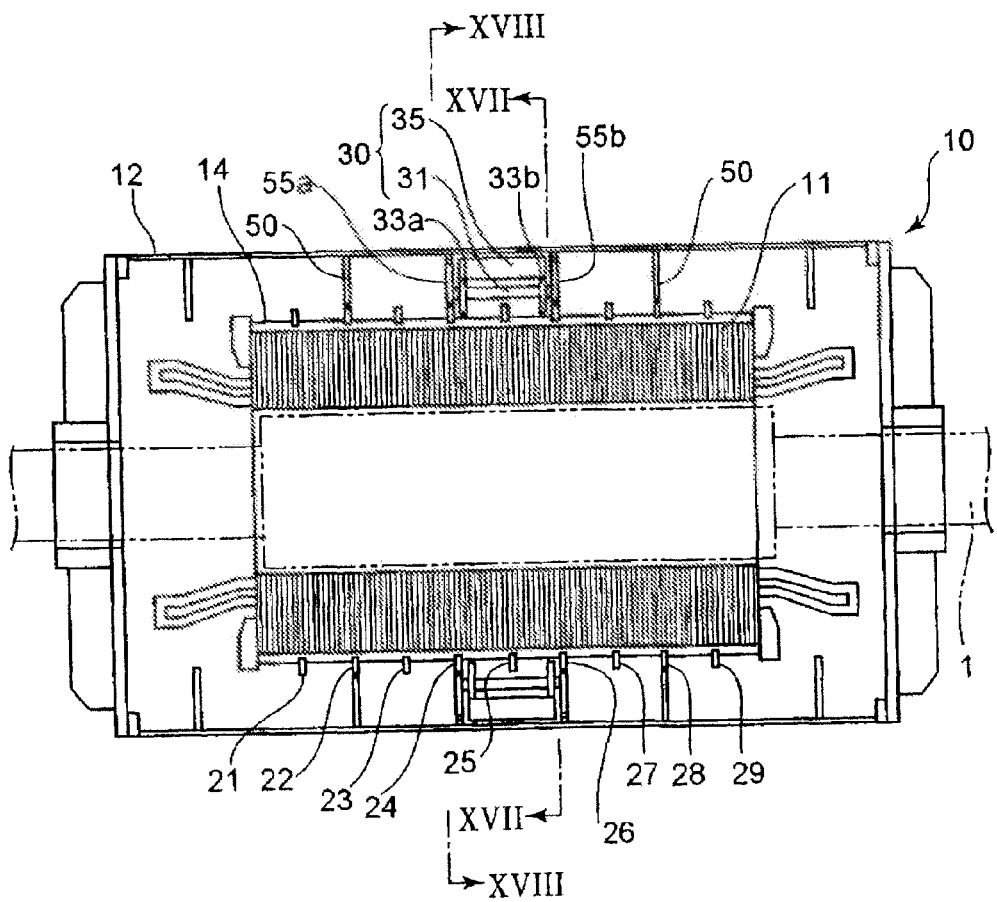
FIG. 16 is a schematic longitudinal cross-sectional view of a third embodiment of a rotating electrical machine of the present invention.
Figure 17:
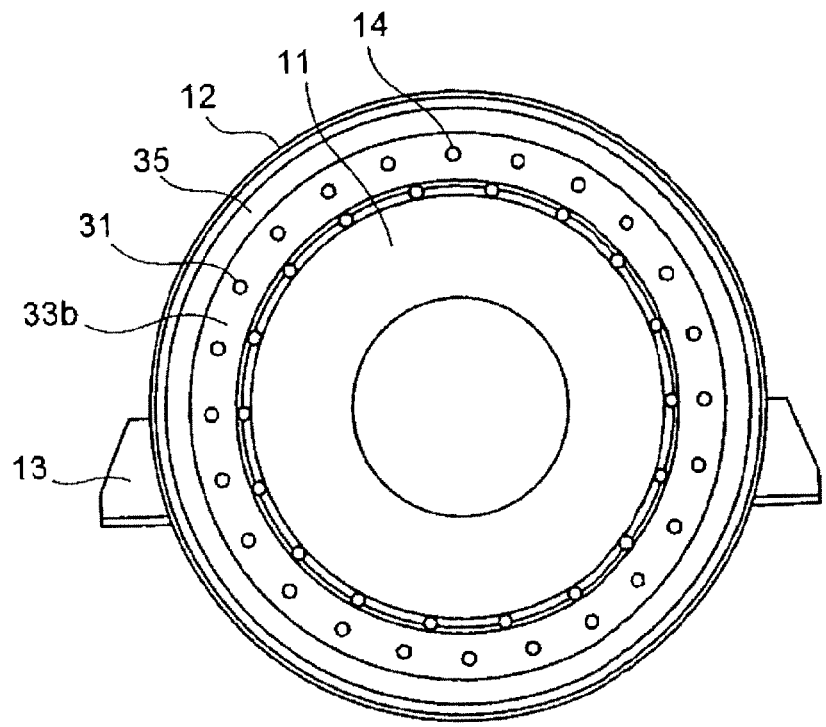
FIG. 17 is a schematic transverse cross-sectional view of FIG. 16 taken along XVII-XVII.
Figure 18:
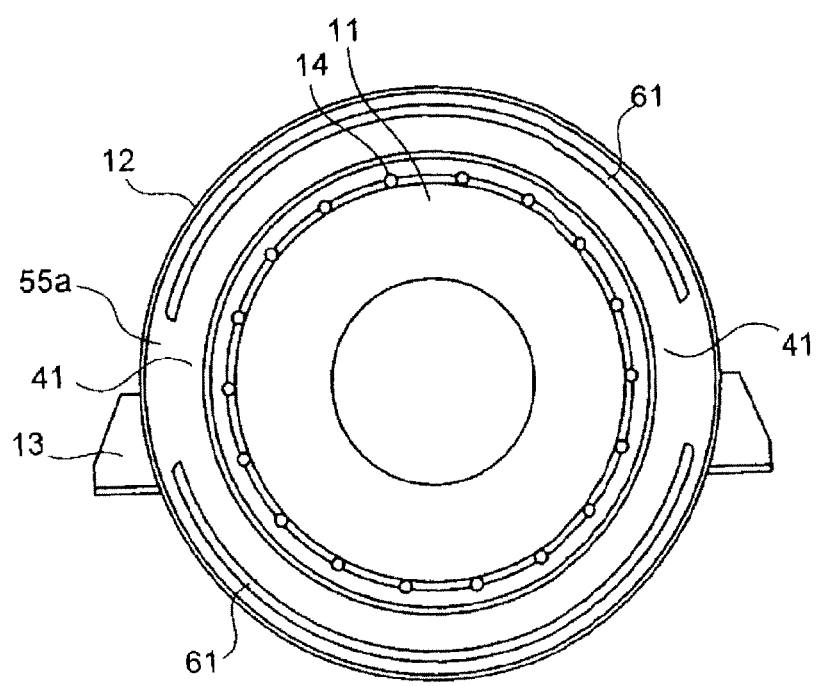
FIG. 18 is a schematic transverse cross-sectional view of FIG. 16 taken along XVIII-XVIII.

A third embodiment of a rotating electrical machine of the present invention will be described with the use of FIG. 4 and FIGS. 16 to 18. FIG. 16 is a schematic longitudinal cross-sectional view of a rotating electrical machine of the present embodiment. FIG. 17 is a schematic transverse cross-sectional view of FIG. 16 taken along XVII-XVII. FIG. 18 is a schematic transverse cross-sectional view of FIG. 16 taken along XVIII-XVIII. Incidentally, in FIGS. 17 and 18, the rotor 1 is not shown.

The present embodiment is an alternative example of the first embodiment (FIGS. 1 to 14). The portions that are the same as or similar to those of the first embodiment are represented by the same reference symbols and will not be described again.

Hereinafter, the configuration of the rotating electrical machine of the present embodiment will be described.

As in the case of the first embodiment, in the rotating electrical machine, a plurality of rib bars 14 are attached to an outer circumference surface of the stator core 11. The rib bars 14 are fixed to the stator core 11 through first to ninth stator core rib plates 21 to 29. The first to ninth stator core rib plates 21 to 29 are arranged in the following order from left to right in the case of FIG. 16: from the first stator core rib plate 21 to the ninth stator core rib plate 29. In this case, the first to third stator core rib plates 21 to 23, as well as the seventh to ninth stator core rib plates 27 to 29, are formed in the same way as in the first embodiment.

In the rotating electrical machine, the vibrating element 30 is connected to the inside of the stator frame 12. The following describes the configuration of a mechanism by which the vibrating element 30 is connected.

The vibrating element 30 includes the spring bars 31 and the circular member 35, which is connected to the spring bars 31 via the first and second circular attachment plates 33a and 33b. The vibrating element 30 is attached to an inner circumference surface of the stator frame 12 via two stator frame connection plates, i.e. a first stator frame connection plate 55a and a second stator frame connection plate 55b.

The first stator frame connection plate 55a is a member that is in the shape of a circular disc on which a hole is made, with the fourth stator core rib plate 24 being disposed on the radial-direction outside. The first stator frame connection plate 55a is so disposed that the inner circumference of the hole maintains a predetermined radial-direction interval on the radial-direction outside of the fourth stator core rib plate 24. One end portion of each spring bar 31 is connected to the first stator frame connection plate 55a.

The first stator frame connection plate 55a is connected to the inner circumference of the stator frame 12 at a predetermined circumferential-direction position. As for the other parts, the radial-direction intervals remain spaced out. Circumferential-direction positions that serve as connection portions, i.e. the first stator core connection portions 41 (FIG. 8), are formed at two locations (in the right and left areas of the diagram), which are positioned substantially at the same height as the rotating center of the rotating shaft. As shown in FIG. 18, the radial-direction intervals are half-circle arc through holes 61, which run in the circumferential direction and are about less than half the circumference of the circle in length; the half-circle arc through holes 61 are formed at two locations in an upper area and a lower area of FIG. 18 so as to contain the center of the rotating shaft and be symmetrical about a line, which is a horizontal line running perpendicularly to the center of the shaft. That is, the first stator frame connection plate 55a is a plate-like member on which two half-circle arc through holes 61 are formed.

The second stator frame connection plate 55b is in the same shape as the first stator frame connection plate 55a. The second stator frame connection plate 55b is disposed on the radial-direction outside of the sixth stator core rib plate 26 so as to maintain a predetermined radial-direction interval. An end portion of each spring bar 31 is connected to the second stator frame connection plate 55b. Therefore, the circular member 35 is elastically supported with respect to the stator frame 12, making up the vibrating element 30.

The fifth stator core rib plate 25 is in the same shape as the third and seventh stator core rib plates 23 and 27. The fifth stator core rib plate 25 fixes the rib bars 14 so as not to interfere with the spring bars 31 and the like.

When the rotor 1 is rotating, the electro-magnetic excitation force, which forms the distribution of the four-node circular mode of vibration, acts on the stator frame 12 via the stator core 11. Since the vibrating element 30 is attached to the stator frame 12, two circular modes of vibration appear on the stator frame 12. The mass, rigidity and other factors of the vibrating element 30 are set so that the natural frequency of each of the circular modes of vibration is lower than vibration frequency $f_{MG}$ of the electro-magnetic excitation force in the case of a low-order $f_L$ (low natural frequency), and that the natural frequency of each of the circular modes of vibration is higher than $f_{MG}$ in the case of a high-order $f_H$ (high natural frequency).

Even though not shown in the diagrams, as in the case of FIG. 4 illustrated in the first embodiment, the second stator core connection portions 52 that are each formed on the second and eighth stator core rib plates 22 and 28 are formed at two locations, which are positioned substantially at the same height as the rotating center of the rotating shaft, as well as two locations in an upper and a lower area (vertical direction), totaling four locations. That is, the stator core 11 and the stator frame 12 are connected together at the above four locations.

The following describes the operation of the vibrating element 30 of the present embodiment.

As for the first mode of the circular mode of vibration of the stator frame 12, the natural frequency is divided into low-order $f_L$ (low natural frequency) and high-order $f_H$ (high natural frequency), with the vibration frequency $f_{MG}$ of the electro-magnetic excitation force therebetween. At this time, the phase relationship of a displacement of the circular member 35 relative to a displacement of the stator core 11 of the first mode is an in-phase relationship in the case of a low-order mode but a reverse-phase relationship in the case of a high-order mode.

The low-order mode and the high-order mode are in the reverse-phase relationship to each other. Therefore, when the modes are each combined, the modes cancel each other. Therefore, it is possible to reduce the displacement of the response of the circular mode of vibration of the stator frame 12 of the first mode for the electro-magnetic excitation force.

Since the vibrating element 30 is connected at a position corresponding to a node portion of the second mode, the vibrating element 30 does not affect the second mode. Therefore, only the response of the circular mode of vibration caused by the second mode is left behind. However, the vibration response is a standing wave and has node portions of vibration.

On the second stator core connection portions 52 that are formed on the second and eighth stator core rib plates and 28, the stator core 11 is formed at positions corresponding to four node portions of the second mode. As described above, the response of the stator frame 12 caused by the electro-magnetic excitation force is a standing wave that vibrates in the form of the second mode; the amplitude is small in the node portions of the second mode.

The vibrating element 30 acts in the same way as in the first embodiment in order to curb the electro-magnetic vibration transmitting to the stator frame 12. Therefore, the amplitude of the vibration transmitting to the stator frame 12 becomes smaller. Moreover, the leg portion 13 is attached to a position corresponding to a node portion of the second mode of the stator frame 12. Thus, it is possible to keep the vibration of the stator frame 12 from transmitting to the base on which the rotating electrical machine is placed.

Fourth Embodiment

Figure 19:
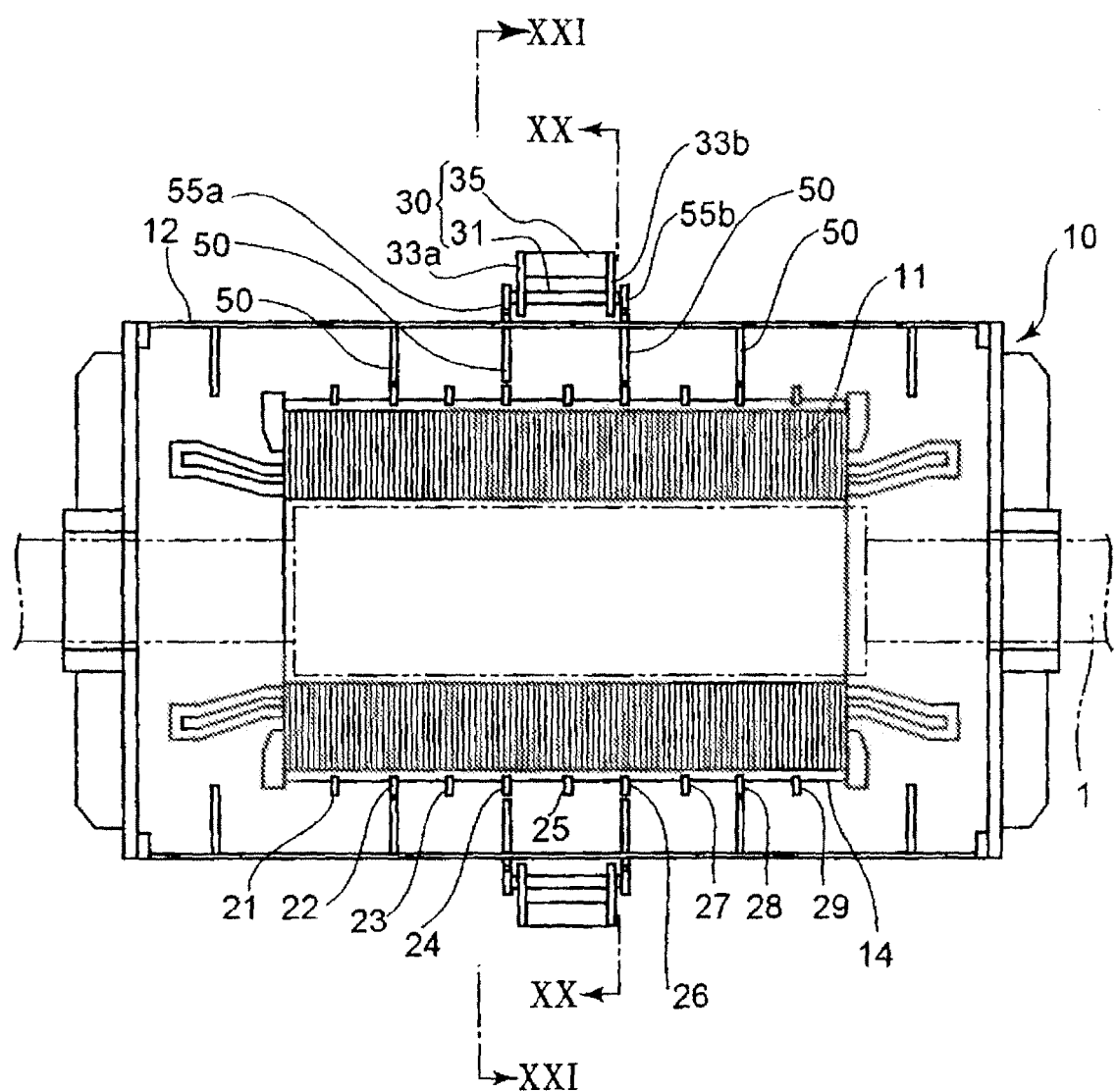
FIG. 19 is a schematic longitudinal cross-sectional view of a fourth embodiment of a rotating electrical machine of the present invention.
Figure 20:
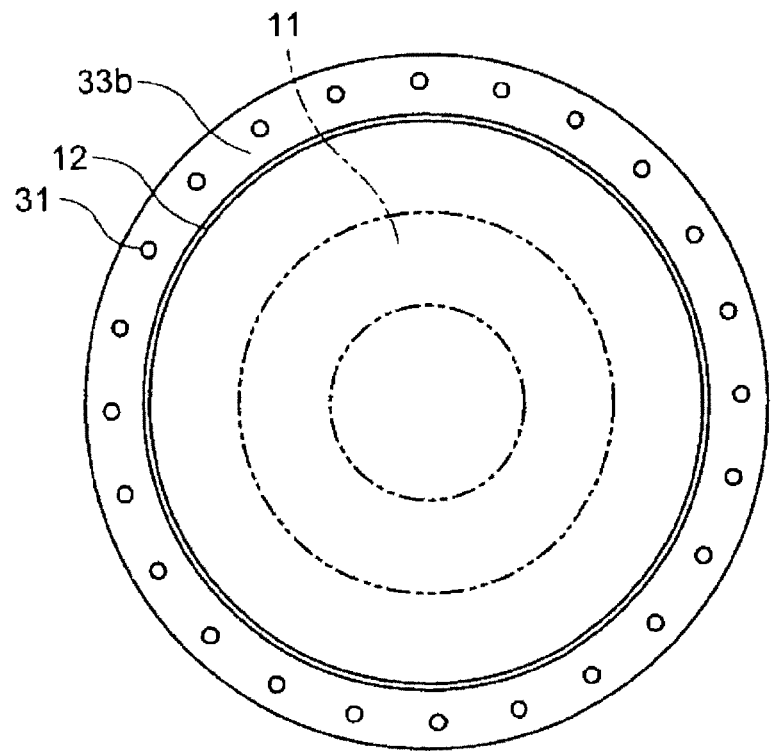
FIG. 20 is a schematic transverse cross-sectional view of FIG. 19 taken along XX-XX.
Figure 21:
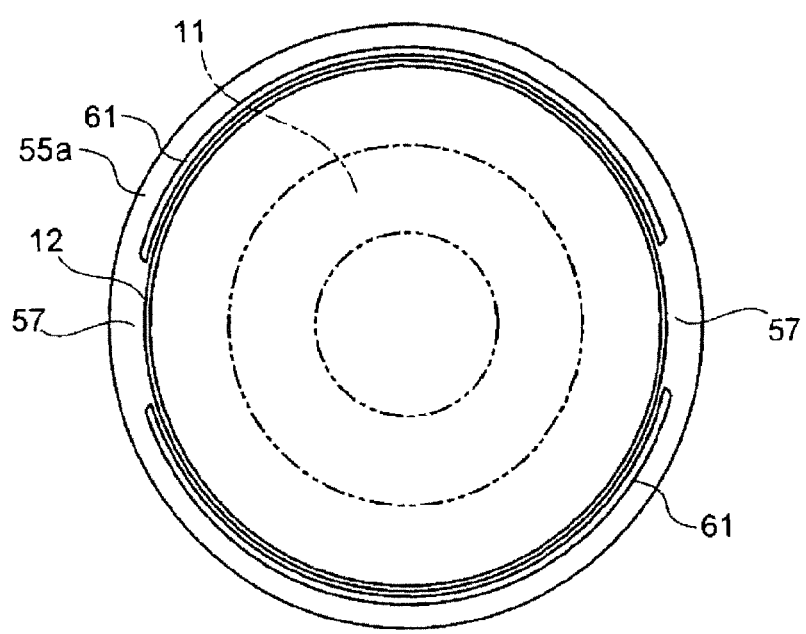
FIG. 21 is a schematic transverse cross-sectional view of FIG. 19 taken along XXI-XXI.

A fourth embodiment of a rotating electrical machine of the present invention will be described with the use of FIG. 4 and FIGS. 19 to 21. FIG. 19 is a schematic longitudinal cross-sectional view of a rotating electrical machine of the present embodiment. FIG. 20 is a schematic transverse cross-sectional view of FIG. 19 taken along XX-XX. FIG. 21 is a schematic transverse cross-sectional view of FIG. 19 taken along XXI-XXI. Incidentally, in FIGS. 20 and 21, the inside of the rotor frame 12 is not shown; only an imaginary stator core 11 is shown.

The present embodiment is an alternative example of the third embodiment. The portions that are the same as or similar to those of the third embodiment (FIGS. 16 to 18) are represented by the same reference symbols and will not be described again.

Hereinafter, the configuration of the rotating electrical machine of the present embodiment will be described.

As in the case of the third embodiment, in the rotating electrical machine, a plurality of rib bars 14 are fixed to the stator core 11 through the first to ninth stator core rib plates 21 to 29.

On the radial-direction outsides of the second, fourth, sixth and eighth stator core rib plates 22, 24, 26 and 28, the stator frame connection portions 50 are formed integrally. As in the case of the stator frame connection portions 50 formed on the second and eighth stator core rib plates 22 and 28, which are described with the use of FIG. 4, the stator frame connection portions 50 are connected to the inside of the stator frame 12.

The vibrating element 30 of the present embodiment is attached to the outside of the stator frame 12. The following describes the configuration of a mechanism by which the vibrating element 30 is connected.

The vibrating element 30 includes the spring bars 31 and the circular member 35, which is connected to the spring bars 31 via the first and second circular attachment plates 33a and 33b. The vibrating element 30 is attached to an outer circumference surface of the stator frame 12 via two stator frame connection plates, i.e. the first stator frame connection plate 55a and the second stator frame connection plate 55b.

The first stator frame connection plate 55a is a member that is in the shape of a circular disc on which a hole is made at the center, with a surface being formed so as to extend in the radial direction. The first stator frame connection plate 55a is so disposed that the stator frame 12 is inside the hole. Moreover, the first stator frame connection plate 55a is provided on an outer circumference surface of the stator frame 12 so as to be on a line extending from the fourth stator core rib plate 24 toward the radial-direction outside.

To the surface that extends in the radial direction, one end portion of each spring bar 31 is connected. As for the first stator frame connection plate 55a, on the radial-direction inner portion that is closer to the center than a portion where an end portion of each spring bar 31 is connected, the half-circle arc through holes 61, which run in the circumferential direction and are about less than half the circumference of the circle in length, are formed at two locations in an upper area and a lower area of FIG. 21 so as to contain the center of the rotating shaft and be symmetrical about a line, which is a horizontal line running perpendicularly to the center of the shaft.

The first stator frame connection plate 55a is a plate-like member on which two half-circle arc through holes 61 are formed. Except for the half-circle arc through holes 61, a portion whose radial-direction position is the same turns out to be an outside connection portion 57 where the vibrating element 30 is connected to the stator frame 12.

The second stator frame connection plate 55b is in the same shape as the first stator frame connection plate 55a. The second stator frame connection plate 55b is attached to an outer circumference surface of the stator frame 12 so as to be on a line extending from the sixth stator core rib plate 26 toward the radial-direction outside. An end portion of each spring bar 31 is connected to the second stator frame connection plate 55b. Therefore, the circular member 35 is supported elastically with respect to the stator frame 12, making up the vibrating element 30.

The leg portion 13 is provided on an outer circumference surface of the stator frame 12 at the same position as in the third embodiment.

With the above configuration, it is possible to achieve the same advantageous effects as in the third embodiment. Moreover, the vibrating element 30 is disposed on the outside of the stator frame 12. Therefore, it is possible to attach the vibrating element 30 to an existing rotating electrical machine having no vibrating element 30 in order to curb vibrations.

Fifth Embodiment

Figure 22:
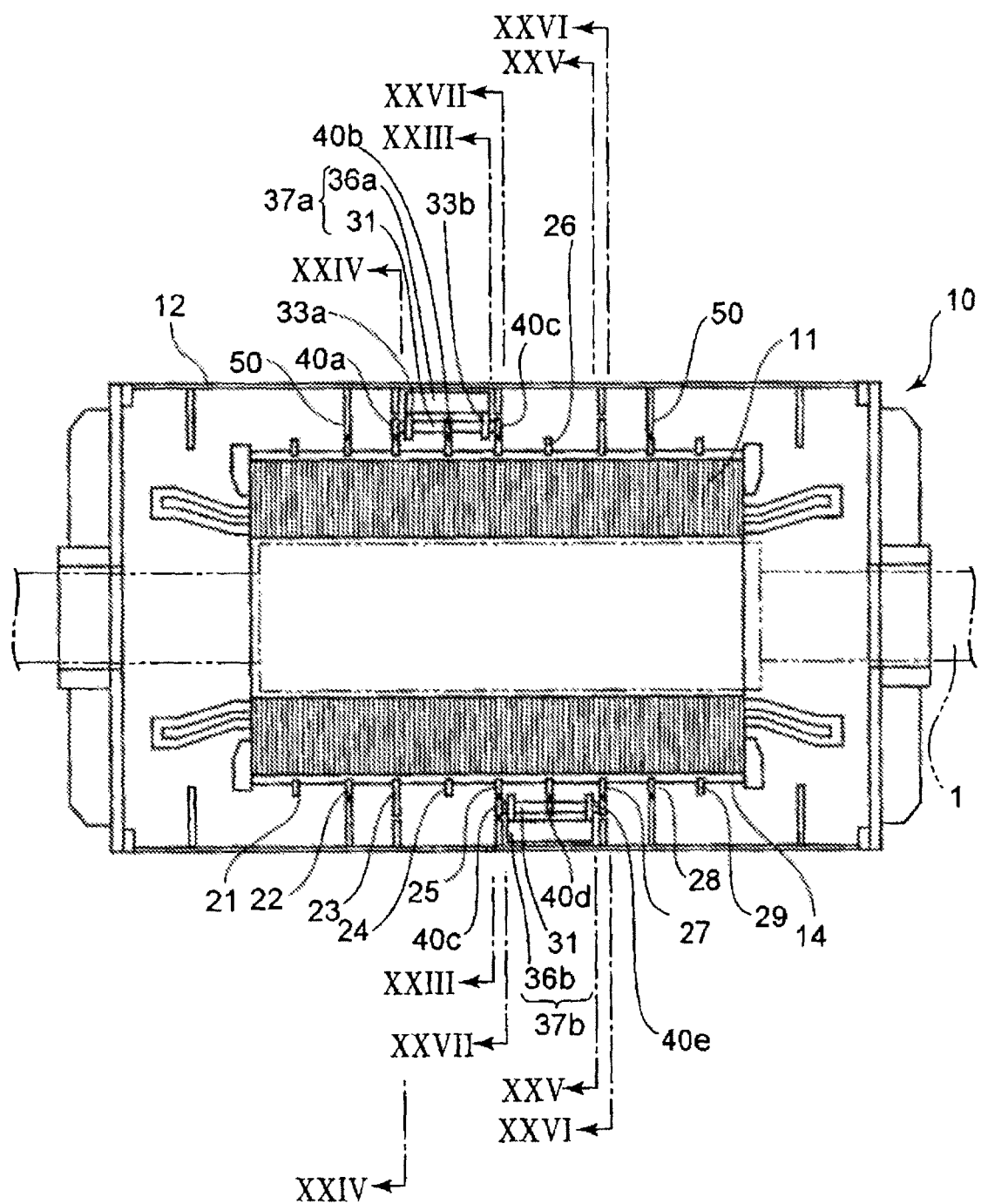
FIG. 22 is a schematic longitudinal cross-sectional view of a fifth embodiment of a rotating electrical machine of the present invention.
Figure 23:
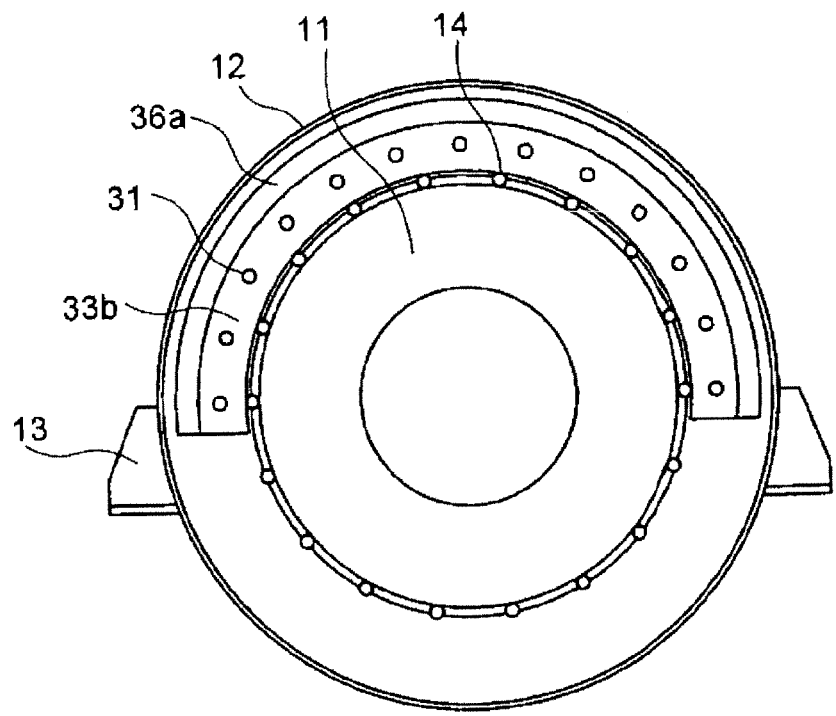
FIG. 23 is a schematic transverse cross-sectional view of FIG. 22 taken along XXIII-XXIII.
Figure 24:
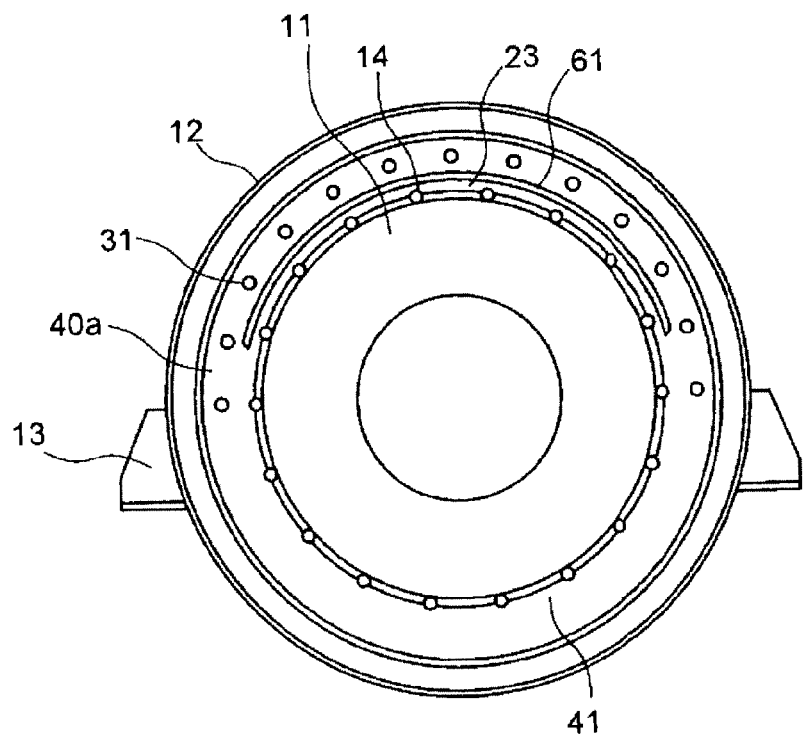
FIG. 24 is a schematic transverse cross-sectional view of FIG. 22 taken along XXIV-XXIV.
Figure 25:
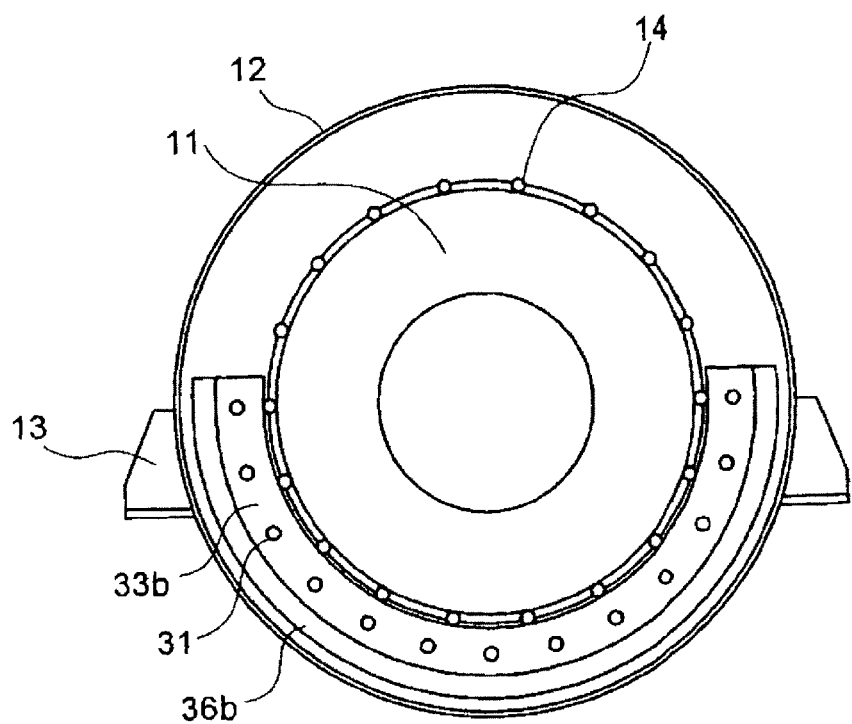
FIG. 25 is a schematic transverse cross-sectional view of FIG. 22 taken along XXV-XXV.
Figure 26:
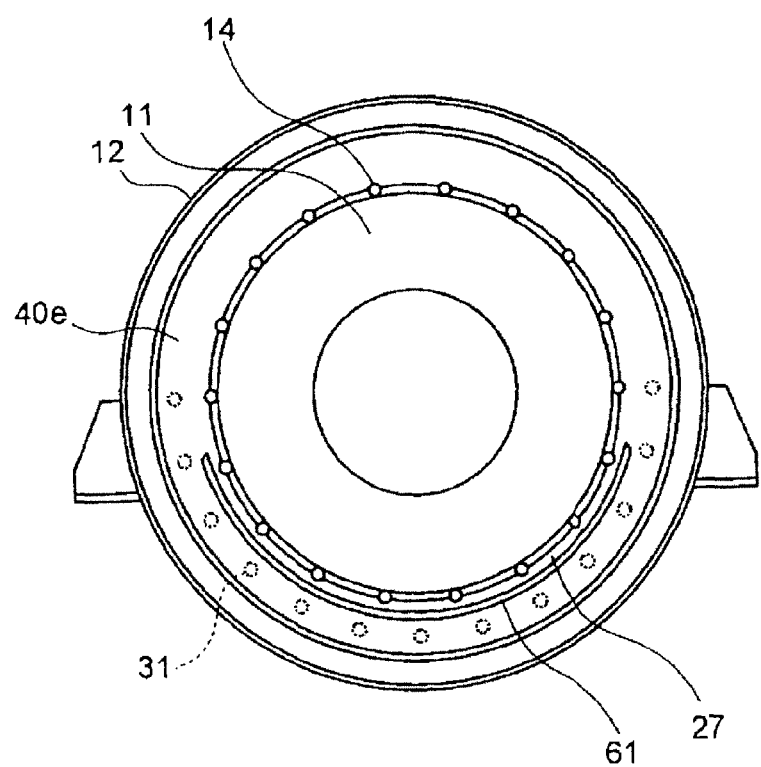
FIG. 26 is a schematic transverse cross-sectional view of FIG. 22 taken along XXVI-XXVI.
Figure 27:
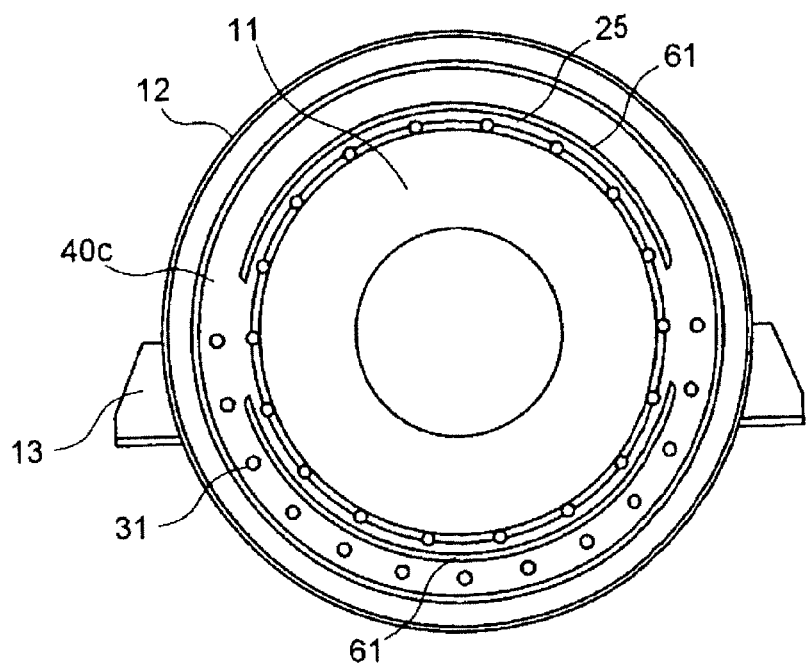
FIG. 27 is a schematic transverse cross-sectional view of FIG. 22 taken along XXVII-XXVII.

A fifth embodiment of a rotating electrical machine of the present invention will be described with the use of FIGS. 1, 3 and 4 and FIGS. 22 to 27. FIG. 22 is a schematic longitudinal cross-sectional view of a rotating electrical machine of the present embodiment. FIG. 23 is a schematic transverse cross-sectional view of FIG. 22 taken along XXIII-XXIII. FIG. 24 is a schematic transverse cross-sectional view of FIG. 22 taken along XXIV-XXIV. FIG. 25 is a schematic transverse cross-sectional view of FIG. 22 taken along XXV-XXV. FIG. 26 is a schematic transverse cross-sectional view of FIG. 22 taken along XXVI-XXVI. FIG. 27 is a schematic transverse cross-sectional view of FIG. 22 taken along XXVII-XXVII. Incidentally, in FIGS. 23 to 27, the rotor 1 is not shown.

Incidentally, the present embodiment is an alternative example of the first embodiment (FIGS. 1 to 14). The portions that are the same as or similar to those of the first embodiment are represented by the same reference symbols and will not be described again.

Hereinafter, the configuration of the rotating electrical machine of the present embodiment will be described.

As in the case of the first embodiment, in the rotating electrical machine, a plurality of rib bars 14 are attached to the stator core 11 through the first to ninth stator core rib plates 21 to 29. On the radial-direction outsides of the second and eighth stator core rib plates 22 and 28, the stator frame connection portions 50 are integrally formed. As in the case of the stator frame connection portions 50 formed on the second and eighth stator core rib plates 22 and 28, which are described with the use of FIG. 4, the stator frame connection portions 50 are connected to the inside of the stator frame 12 at four locations.

The vibrating element 30 of the present embodiment is formed in the following manner: The vibrating element 30 (FIG. 1), which is described in the first embodiment, is divided into two, upper and lower vibrating elements 30, i.e. a first vibrating element 37a and a second vibrating element 37b, which are different in axial-direction position. The following describes the configuration of the first and second vibrating elements 37a and 37b.

The first vibrating element 37a includes the spring bars 31 and a first half-circle arc member 36a (FIG. 23), which is connected to the spring bars 31 via the first and second circular attachment plates 33a and 33b.

The first half-circle arc member 36a is one of members, which are produced by dividing the circular member 35, described in the first embodiment, in such a way that the center angle is about 180 degrees. The first and second circular attachment plates 33a and 33b, which connect the spring bars 31 to the first half-circle arc member 36a, are formed in the same way as in the first embodiment (FIG. 1).

On the radial-direction outsides of the third to fifth stator core rib plates 23 to 25, the first to third spring bar attachment portions 40a to 40c are each formed integrally in order to fix the spring bars 31 of the first vibrating element 37a. The first to third spring bar attachment portions 40a to 40c are in the shape of a plate, covering the third to fifth stator core rib plates 23 to 25 across the entire circumference from the radial-direction outsides, with a surface being formed so as to extend in the radial direction. One end portion (the left end portion shown in FIG. 22) of each spring bar 31 is attached to a surface extending in the radial direction of the first spring bar attachment portion 40a formed on the third stator core rib plate 23. The other end portion (the right end portion shown in FIG. 22) of each spring bar 31 is attached to the surface of the third spring bar attachment portion 40c of the fifth stator core rib plate 25. Each spring bar 31 is fixed so as to pass through a surface extending in the radial direction of the second spring bar attachment portion 40b of the fourth stator core rib plate 24.

On a surface extending in the radial direction of the third spring bar attachment portion 40c, the spring bars of the second vibrating element 37b, which are described later, are connected on a side opposite to a side on which the spring bars 31 of the first vibrating element 37a are connected.

The first and second spring bar attachment portions 40a and 40b formed on the third and fourth stator core rib plates 23 and 24 are connected to the third and fourth stator core rib plates 23 and 24, respectively, at predetermined circumferential-direction positions. As for the other parts, the radial-direction intervals remain spaced out. Circumferential-direction positions that serve as connection portions, i.e. the first stator core connection portions 41 (FIG. 24), are formed from an area slightly higher than the rotating center of the rotating shaft to a lower half. As shown in FIG. 24, the radial-direction intervals are a half-circle arc through holes 61, which runs in the circumferential direction and is about less than half the circumference of the circle in length; the half-circle arc through hole 61 is formed in an upper area of FIG. 24. That is, the third and fourth stator core rib plates 23 and 24 are plate-like members on which one half-circle arc through hole 61 is formed.

The third spring bar attachment portions 40c formed on the fifth stator core rib plate 25 is connected to the fifth stator core rib plate 25 at a predetermined circumferential-direction position. As for the other parts, the radial-direction intervals remain spaced out. Circumferential-direction positions that serve as connection portions, i.e. the first stator core connection portions 41 (FIG. 27), are formed at two locations (in a left and a right area of the diagram), which are substantially positioned at the same height as the rotating center of the rotating shaft. As shown in FIG. 27, the radial-direction intervals are half-circle arc through holes 61, which run in the circumferential direction and are about less than half the circumference of the circle in length; the half-circle arc through holes 61 are formed at two locations in an upper area and a lower area of FIG. 27 so as to contain the center of the rotating shaft and be symmetrical about a line, which is a horizontal line running perpendicularly to the center of the shaft. That is, the fifth stator core rib plate 25 is a plate-like member on which two half-circle arc through holes 61 are formed; the fifth stator core rib plate 25 is in the same shape as the fourth to sixth stator core rib plates 24 to 26, which are described in the first embodiment (FIG. 3).

The second vibrating element 37b includes the spring bars 31 and a second half-circle arc member 36b (FIG. 25), which is connected to the spring bars 31 via the first and second circular attachment plates 33a and 33b.

The second half-circle arc member 36b is in the same shape as the first half-circle arc member 36a, and is disposed so as to face downward with respect to the first half-circle arc member 36a and to be different in axial-direction position. The first and second circular attachment plates 33a and 33b, which connect the spring bars 31 and the second half-circle arc member 36b, are formed in the same way as the first and second circular attachment plates 33a and 33b formed on the first half-circle arc member 36a.

On the radial-direction outsides of the fifth to seventh stator core rib plates 25 to 27, the third to fifth spring bar attachment portions 40c to 40e are each formed integrally in order to fix the spring bars 31 of the second vibrating element 37b. The third to fifth spring bar attachment portions 40c to 40e are in the shape of a plate, covering the fifth to seventh stator core rib plates 25 to 27 across the entire circumference from the radial-direction outsides, with a surface being formed so as to extend in the radial direction. One end portion (the left end portion shown in FIG. 22) of each spring bar 31 is attached to a surface extending in the radial direction of the third spring bar attachment portion 40c formed on the fifth stator core rib plate 25. The other end portion (the right end portion shown in FIG. 22) of each spring bar 31 is attached to the surface of the fifth spring bar attachment portion 40e of the seventh stator core rib plate 27. Each spring bar 31 is fixed so as to pass through a surface extending in the radial direction of the fifth spring bar attachment portion 40d of the sixth stator core rib plate 26.

On the third spring bar attachment portion 40c of the fifth stator core rib plate 25, the spring bars 31 of the first vibrating element 37a are connected to the right side shown in FIG. 22; the spring bars 31 of the second vibrating element 37b are connected to the left side.

The fourth and fifth spring bar attachment portions 40d and 40e formed on the sixth and seventh stator core rib plates 26 and 27 are connected to the sixth and seventh stator core rib plates 27, respectively, at predetermined circumferential-direction positions. As for the other parts, the radial-direction intervals remain spaced out. Circumferential-direction positions that serve as connection portions, i.e. the first stator core connection portions 41 (FIG. 26), are formed from an area slightly lower than the rotating center of the rotating shaft to an upper half. As shown in FIG. 26, the radial-direction intervals are a half-circle arc through hole 61, which runs in the circumferential direction and is about less than half the circumference of the circle in length; the half-circle arc through hole 61 is formed in a lower area of FIG. 26. That is, the sixth and seventh stator core rib plates 26 and 27 are plate-like members on which one half-circle arc through hole 61 is formed.

The first and second vibrating elements 37a and 37b act in the same way as the vibrating element 30 of the first embodiment. Accordingly, when the first and second vibrating elements 37a and 37b are attached to the stator core 11, the natural frequency of the first mode of the four-node circular mode of vibration is divided into two. The configuration of the first and second vibrating elements 37a and 37b is set so that of the two natural frequencies, low-order vibration frequency $f_L$ is lower than vibration frequency $f_{MG}$ of the electromagnetic excitation force, while high-order vibration frequency $f_H$ is higher than $f_{MG}$.

It is clear from the above description that according to the present embodiment, it is possible to achieve the same advantageous effects as in the first embodiment.

According to the first embodiment, the vibrating element 30 is formed across the entire circumference at predetermined axial-direction positions. According to the present embodiment, the vibrating elements 30 are so formed that the first and second vibrating elements 37a and 37b are different in axial-direction position. Thus, it is possible to make a coolant gas medium flow in the axial direction in a more efficient manner.

Sixth Embodiment

A sixth embodiment of a rotating electrical machine of the present invention will be described with the use of FIG. 28.

Figure 28:
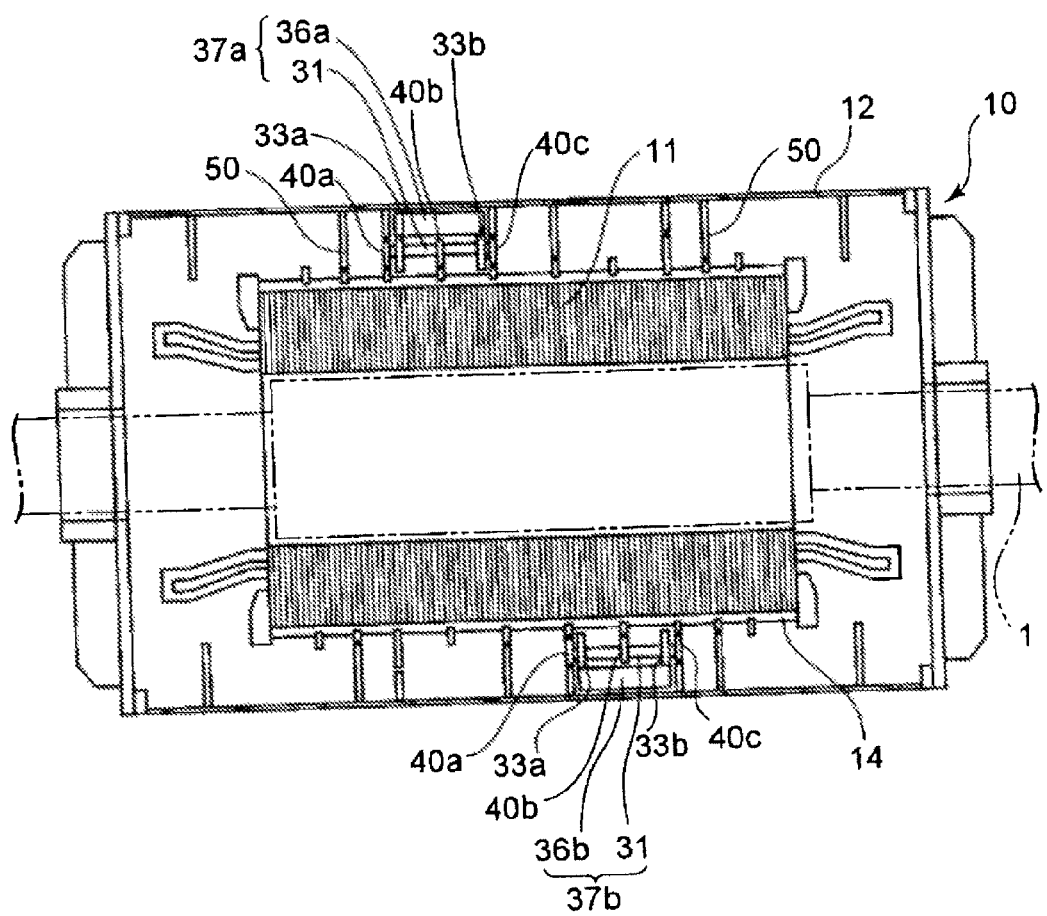
FIG. 28 is a schematic longitudinal cross-sectional view of a sixth embodiment of a rotating electrical machine of the present invention.

FIG. 28 is a schematic longitudinal cross-sectional view of a rotating electrical machine of the present embodiment. Incidentally, the present embodiment is an alternative example of the fifth embodiment (FIGS. 22 to 27). The portions that are the same as or similar to those of the fifth embodiment are represented by the same reference symbols and will not be described again.

According to the present embodiment, the first and second vibrating elements 37a and 37b are provided so as to be spaced out in the axial direction from each other. Therefore, it is possible to achieve the same advantageous effects as in the fifth embodiment, as well as to make a coolant gas medium flow in a more efficient manner.

Seventh Embodiment

Figure 29:
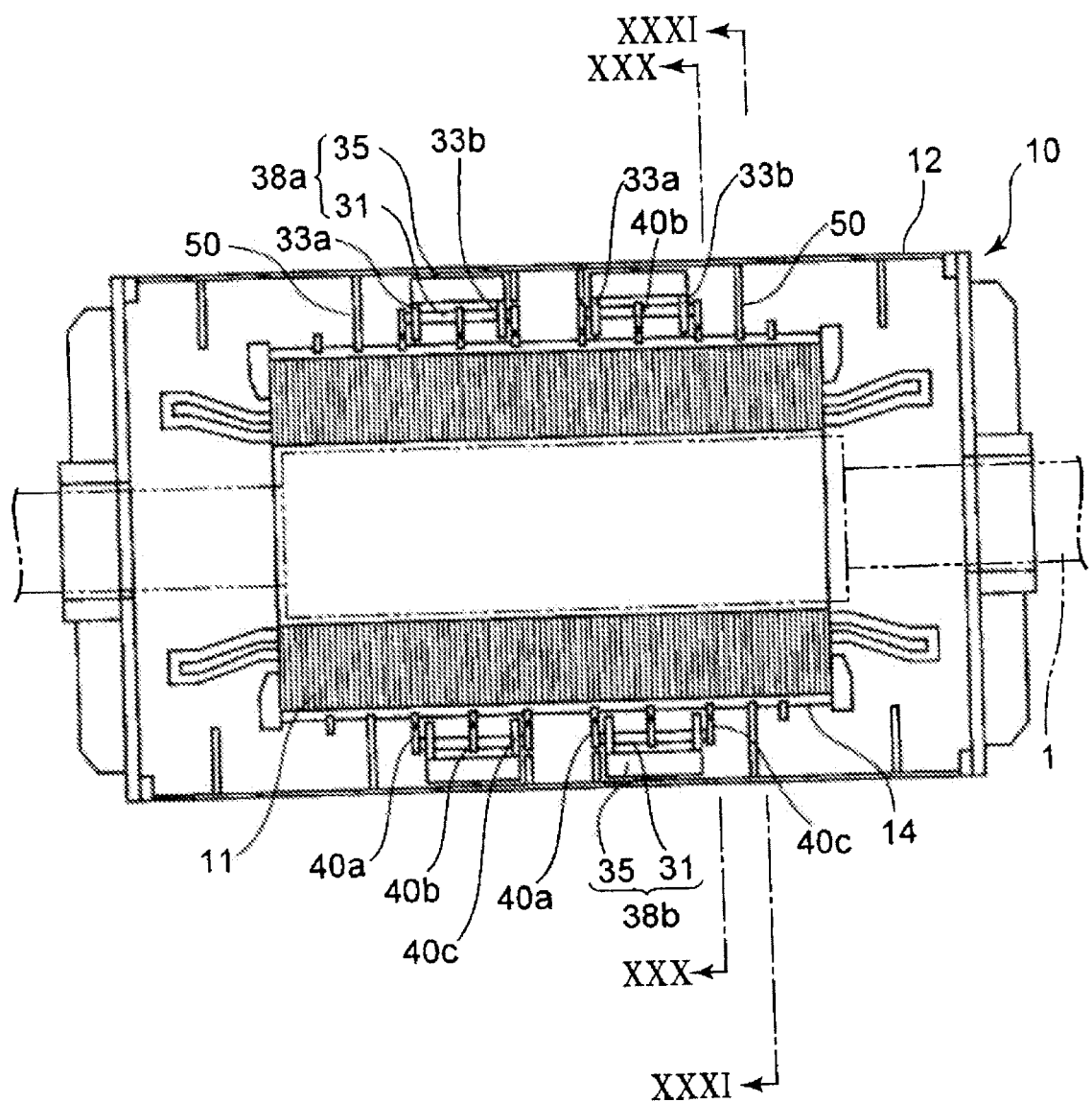
FIG. 29 is a schematic longitudinal cross-sectional view of a seventh embodiment of a rotating electrical machine of the present invention.
Figure 30:
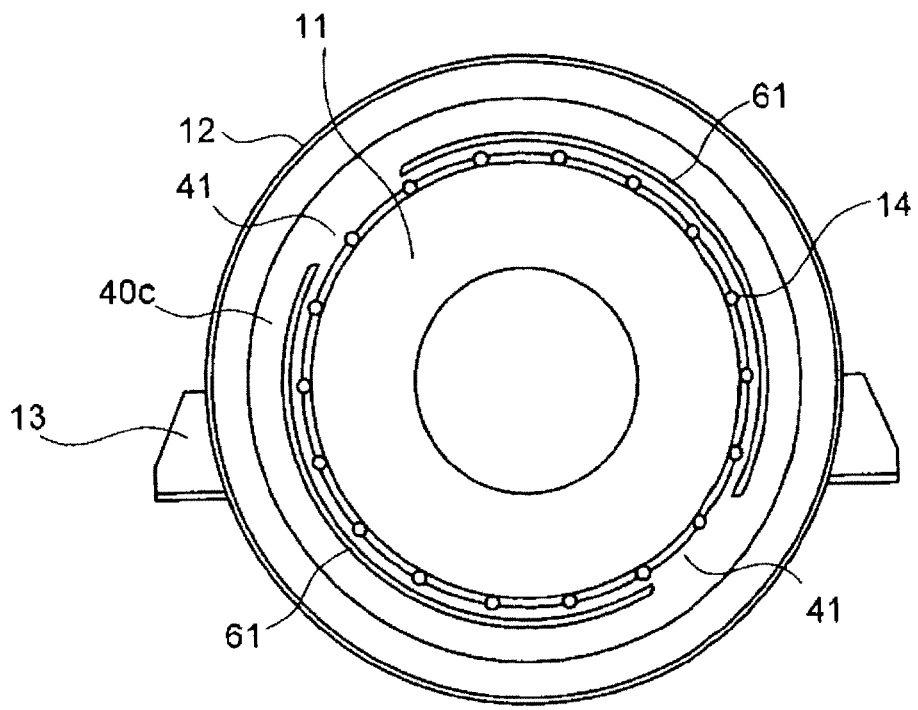
FIG. 30 is a schematic transverse cross-sectional view of FIG. 29 taken along XXX-XXX.
Figure 31:
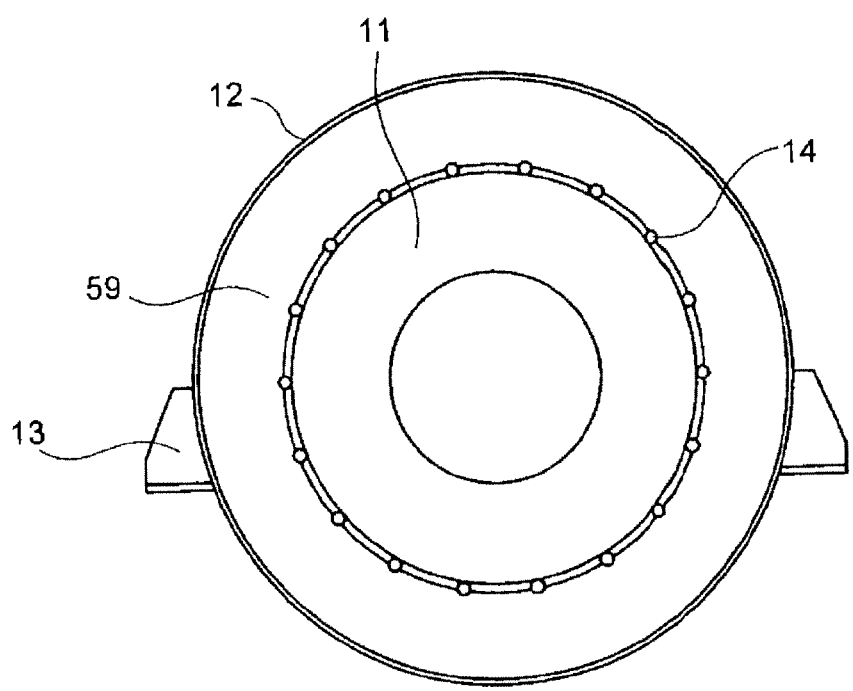
FIG. 31 is a schematic transverse cross-sectional view of FIG. 29 taken along XXXI-XXXI.

A seventh embodiment of a rotating electrical machine of the present invention will be described with the use of FIGS. 8 and 9 and FIGS. 29 to 33. FIG. 29 is a schematic longitudinal cross-sectional view of a rotating electrical machine of the present embodiment. FIG. 30 is a schematic transverse cross-sectional view of FIG. 29 taken along XXX-XXX. FIG. 31 is a schematic transverse cross-sectional view of FIG. 29 taken along XXXI-XXXI. Incidentally, in FIGS. 30 and 31, the rotor 1 is not shown.

Figure 32:
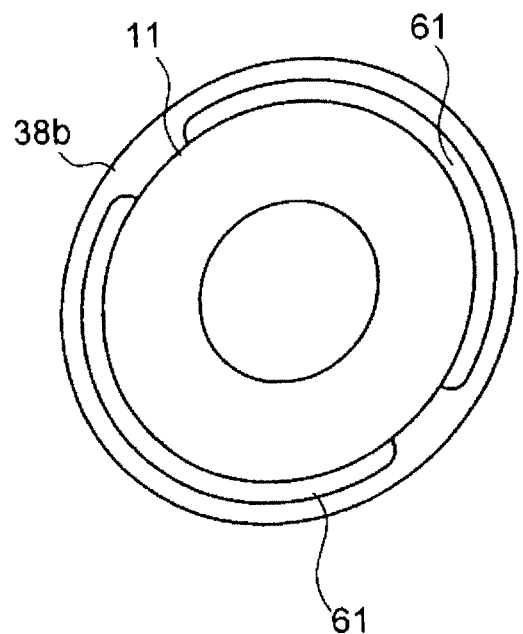
FIG. 32 is a model diagram showing a second natural circular mode of vibration (second mode) of the stator shown in FIG. 29, illustrating an in-phase mode in which the stator core and a vibrating element deform in the same direction.
Figure 33:
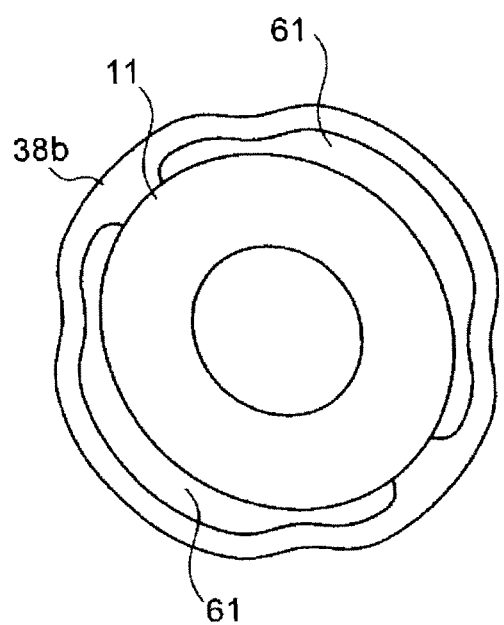
FIG. 33 is a model diagram showing the second natural circular mode of vibration (second mode) of the stator shown in FIG. 29, illustrating a reverse phase mode in which the stator core and the vibrating element deform in opposite directions.

FIG. 32 is a model diagram showing a second natural circular mode of vibration (second mode) of the stator 10 shown in FIG. 29, illustrating an in-phase mode in which the stator core 11 and a second mode vibrating element 38b deform in the same direction. FIG. 33 is a model diagram showing the second natural circular mode of vibration (second mode) of the stator 10 shown in FIG. 29, illustrating a reverse phase mode in which the stator core 11 and the second mode vibrating element 38b deform in opposite directions.

Incidentally, the present embodiment is an alternative example of the first embodiment (FIGS. 1 to 14). The portions that are the same as or similar to those of the first embodiment are represented by the same reference symbols and will not be described again.

Hereinafter, the configuration of the rotating electrical machine of the present embodiment will be described.

The rotating electrical machine includes two vibrating elements 30, i.e. a first mode vibrating element 38a and the second mode vibrating element 38b, which is placed a predetermined axial-direction distance away from the vibrating element 30.

The first mode vibrating element 38a is formed in the same way as the vibrating element 30 described in the first embodiment. The first mode vibrating element 38a is attached. Therefore, the natural frequency corresponding to the first mode of the four-node circular mode of vibration of the stator core 11 is divided into low-order frequency $f_{L1}$ and high-order frequency $f_{H1}$. The mass, rigidity and other factors of the first mode vibrating element 38a are set so that frequency $f_{MG}$ of the electro-magnetic excitation force is sandwiched between the above natural frequencies.

The second mode vibrating element 38b is in the same shape as the first mode vibrating element 38a. At the same time, the difference in circumferential-direction position between the first stator core connection portion 41 of the second mode vibrating element 38b and the first stator core connection portion 41 of the first mode vibrating element 38a is about 45 degrees (FIG. 30).

The second mode vibrating element 38b is attached. Therefore, the natural frequency corresponding to the second mode of the four-node circular mode of vibration of the stator core 11 is divided into low-order frequency $f_{L2}$ and high-order frequency $f_{H2}$. The mass, rigidity and other factors of the second mode vibrating element 38b are set so that frequency $f_{MG}$ of the electro-magnetic excitation force is sandwiched between the above natural frequencies.

In general, the natural frequencies of the first and second modes take substantially the same value. That is, it can be assumed that $f_{L1} = f_{L2} = f_L$ and $f_{H1} = f_{H2} = f_H$. Moreover, as for $f_L$, $f_H$ and $f_{MG}$, adjustments are made to the structure, configuration and shape of the circular members 35 of the first and second mode vibrating elements 38a and 38b, as well as the rigidity, number and other factors of the spring bars 31, in order to achieve the relationship of formula (4).

Moreover, the first mode vibrating element 38a does not affect the second mode of the four-node circular mode of vibration of the stator core 11. The second mode vibrating element 38b also does not affect the first mode of the four-node circular mode of vibration of the stator core 11. That is, as for the relationship between the first mode vibrating element 38a and the second mode vibrating element 38b, the natural frequencies are equal, but the first mode vibrating element 38a and the second mode vibrating element 38b are independent of each other.

As shown in FIG. 31, the stator core 11 and the stator frame 12 are connected together across the entire circumference through a frame rib plate 59. That is, a portion corresponding to the second stator core connection portions 52 (FIG. 4), which are described in the first embodiment, is a circumferential-direction entire area of the stator core 11.

The following describes the operation of the first and second mode vibrating elements 38a and 38b.

The first mode vibrating element 38a is attached. Therefore, the natural frequency of the first mode of the stator core 11 is divided into low-order frequency $f_{L1}$ and high-order frequency $f_{H1}$. At this time, the form of the natural mode of vibration is the same as those shown in FIGS. 8 and 9, which are described in the first embodiment. That is, the phase relation of the displacement of the stator core 11 and the circular member 35 is an in-phase relationship in the case of a low-order mode but a reverse-phase relationship in the case of a high-order mode.

When formula (4) is true between the natural frequency and the vibration frequency of the electro-magnetic excitation force, the mode response for the electro-magnetic excitation force represents the form of the natural mode of vibration shown in FIGS. 8 and 9. Therefore, the phase of the displacement of the stator core 11 in a low-order mode is opposite to that in a high-order mode; the response displacements of the first mode, which are obtained by combining the modes, cancel each other.

Meanwhile, since the second mode vibrating element 38b is placed, the natural frequency of the second mode of the stator core 11 is divided into low-order frequency $f_{L2}$ and high-order frequency $f_{H2}$. At this time, the circular natural mode of vibration takes the forms as shown in FIGS. 32 and 33. The phase relation of the displacement of the stator core 11 and the circular member 35 is an in-phase relationship in the case of a low-order mode form shown in FIG. 32 but a reverse-phase relationship in the case of a high-order mode form shown in FIG. 33.

When formula (4) is true, the mode response of the second mode for the electro-magnetic excitation force similarly takes the forms of the natural mode of vibration shown in FIGS. 32 and 33. Therefore, the phase of the displacement of the stator core 11 in a low-order mode is opposite to that in a high-order mode; the low- and high-order response displacements of the second mode, when the modes are combined, cancel each other.

As described above, according to the present embodiment, it is possible to curb the vibrations of the first and second modes of the stator core 11. Therefore, it is possible to keep the vibrations from transmitting to the base, where the rotating electrical machine is placed, via the leg portion 13 provided on the stator frame 12.

Eighth Embodiment

Figure 34:
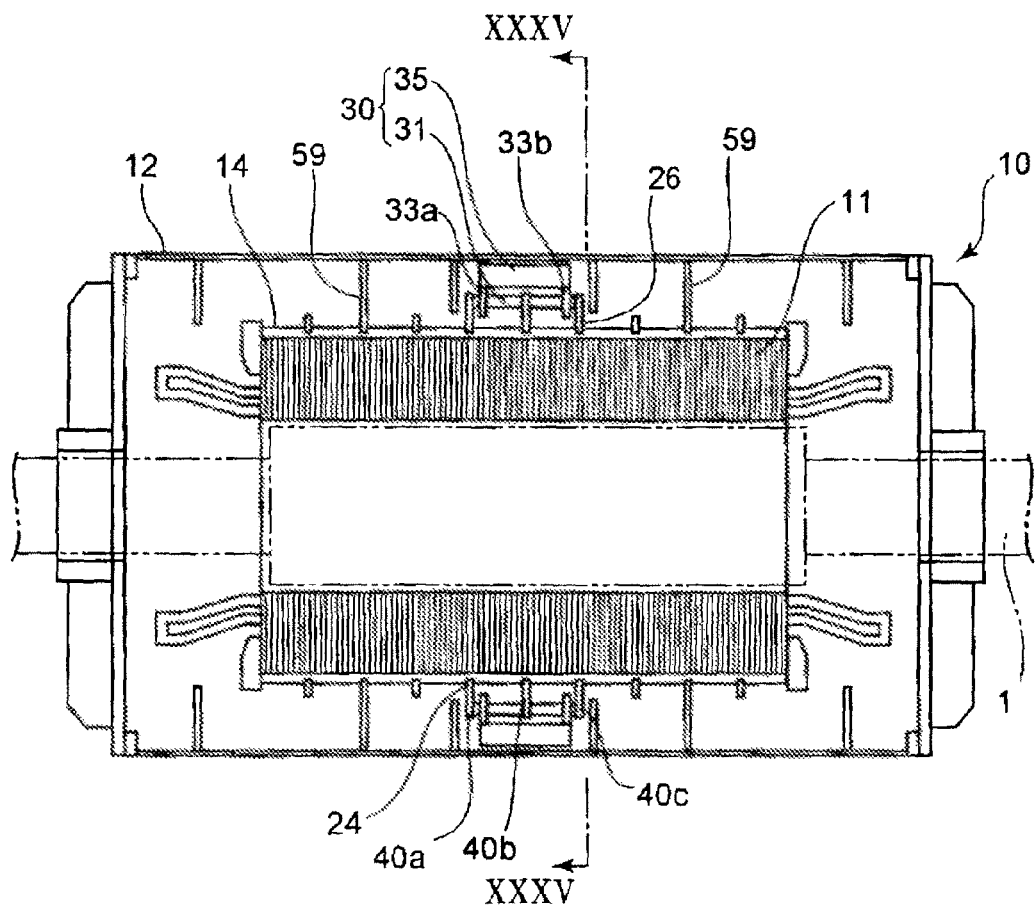
FIG. 34 is a schematic longitudinal cross-sectional view of an eighth embodiment of a rotating electrical machine of the present invention.
Figure 35:
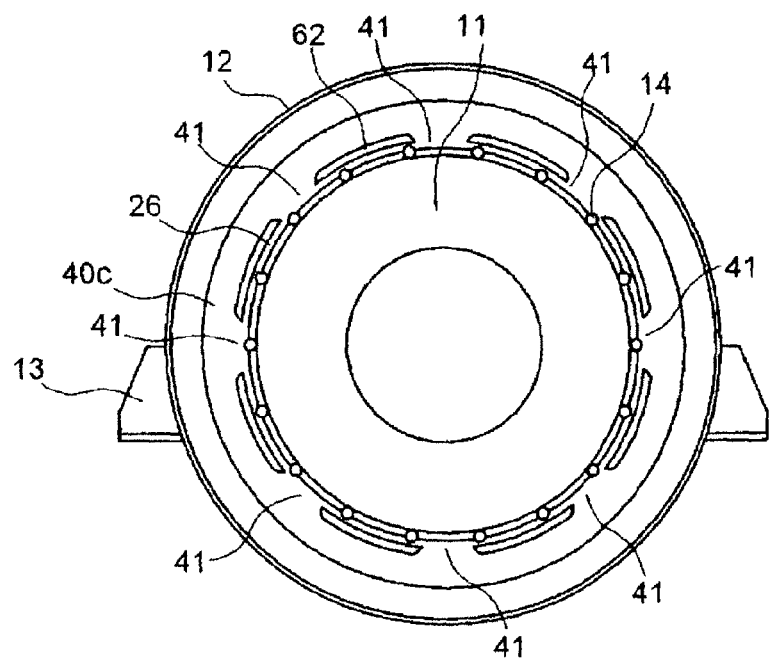
FIG. 35 is a schematic transverse cross-sectional view of FIG. 34 taken along XXXV-XXXV.

An eighth embodiment of a rotating electrical machine of the present invention will be described with the use of FIGS. 15 and 31 and FIGS. 34 to 39. FIG. 34 is a schematic longitudinal cross-sectional view of a rotating electrical machine of the present embodiment. FIG. 35 is a schematic transverse cross-sectional view of FIG. 34 taken along XXXV-XXXV. Incidentally, in FIG. 35, the rotor 1 is not shown.

Figure 36:
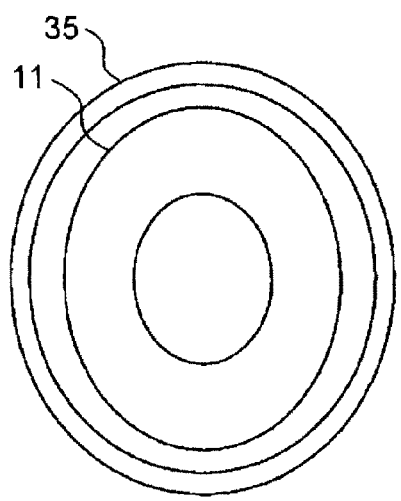
FIG. 36 is a model diagram schematically showing a first natural circular mode of vibration (first mode) of the stator shown in FIG. 34, illustrating an in-phase mode in which the stator core and the circular member deform in the same direction.
Figure 37:
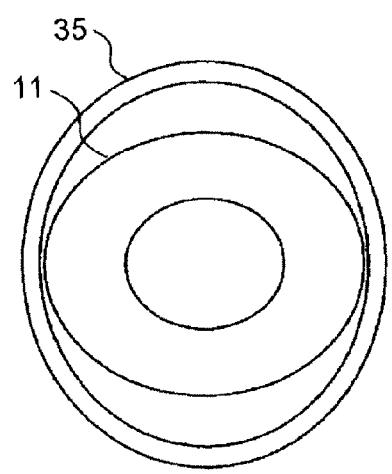
FIG. 37 is a model diagram schematically showing the first natural circular mode of vibration (first mode) of the stator shown in FIG. 34, illustrating a reverse phase mode in which the stator core and the circular member deform in opposite directions.

FIG. 36 is a model diagram schematically showing a first natural circular mode of vibration (first mode) of the stator shown in FIG. 34, illustrating an in-phase mode in which the stator core 11 and the circular member 35 deform in the same direction. FIG. 37 is a model diagram schematically showing the first natural circular mode of vibration (first mode) of the stator shown in FIG. 34, illustrating a reverse phase mode in which the stator core and the circular member 35 deform in opposite directions.

Figure 38:
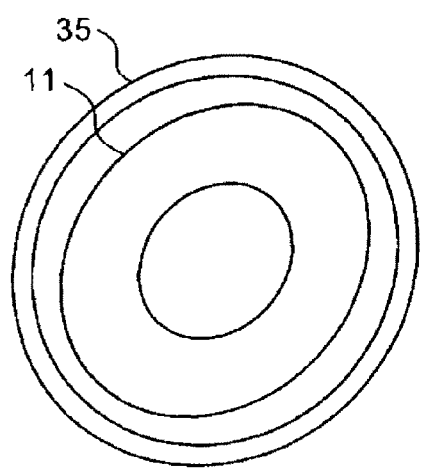
FIG. 38 is a model diagram schematically showing a second natural circular mode of vibration (second mode) of the stator shown in FIG. 34, illustrating an in-phase mode in which the stator core and the circular member deform in the same direction.
Figure 39:
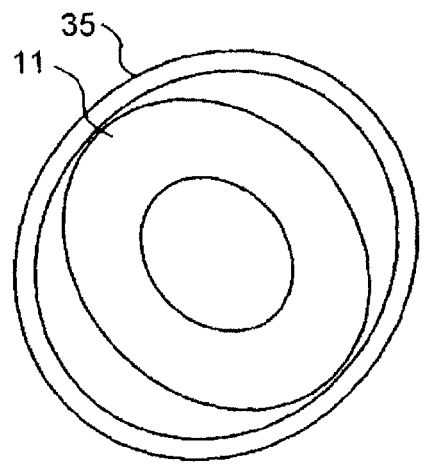
FIG. 39 is a model diagram schematically showing the second natural circular mode of vibration (second mode) of the stator shown in FIG. 34, illustrating a reverse phase mode in which the stator core and the circular member deform in opposite directions.

FIG. 38 is a model diagram schematically showing a second natural circular mode of vibration (second mode) of the stator shown in FIG. 34, illustrating an in-phase mode in which the stator core 11 and the circular member 35 deform in the same direction. FIG. 39 is a model diagram schematically showing the second natural circular mode of vibration (second mode) of the stator shown in FIG. 34, illustrating a reverse phase mode in which the stator core 11 and the circular member 35 deform in opposite directions.

Incidentally, according to the present embodiment, the features, of the seventh embodiment (FIGS. 29 to 33), is added to the features of the second embodiment (FIG. 15). The portions that are the same as or similar to those of the second and seventh embodiments are represented by the same reference symbols and will not be described again.

As shown in FIG. 35, the first stator core connection portions 41 of the present embodiment are formed at eight locations, which are evenly spaced out in the circumferential direction. The first stator core connection portions 41 are a result of combining those obtained by the connection method described with the use of FIG. 15 in the second embodiment and those obtained by rotating and moving the above by 45 degrees in the circumferential direction.

As in the case of the frame rib plate 59 described with the use of FIG. 31 in the seventh embodiment, the stator core 11 and the stator frame 12 are connected across the entire circumference.

When the first stator core connection portions 41 are formed as described above, it is possible to allow the vibrating element 30 to act in both the first and second modes of the four-node circular mode of vibration. Because of the phase relation of the displacement of the circular member 35 relative to the displacement of the stator core 11 in response to the first mode of the four-node circular mode of vibration of the stator core 11, two modes shown in FIGS. 36 and 37 appear.

FIG. 36 shows an in-phase mode in which the stator core 11 and the circular member 35 change in the same direction. FIG. 37 shows a reverse phase mode in which the stator core 11 and the circular member 35 change in opposite directions. At this time, natural frequency $f_{L1}$ of the in-phase mode goes below the original natural frequency; natural frequency $f_{H1}$ of the reverse-phase mode goes above the original natural frequency.

As for the second mode, two modes appear as shown in FIGS. 38 and 39. When compared with the first mode, the direction of the main axis of the second mode (ellipse) is tilted at 45 degrees in the circumferential direction. FIG. 38 shows that the amplitude of the stator core 11 is in the same direction as that of the circular member 35. FIG. 39 shows that the amplitude of the stator core 11 is in a direction opposite to that of the circular member 35. That is, FIG. 38 shows an in-phase mode, while FIG. 39 shows a reverse-phase mode.

At this time, natural frequency $f_{L2}$ of the in-phase mode goes below the original natural frequency; natural frequency $f_{H2}$ of the reverse-phase mode goes above the original natural frequency.

With the above configuration, the stator core 11 and the vibrating element 30 are isotropic, meaning that the rigidity and mass do not change in any directions. Therefore, the natural frequency of the first mode takes substantially the same value as that of the second mode. That is, it can be assumed that $f_{L1}=f_{L2}=f_L$ and $f_{H1}=f_{H2}=f_H$ as in the case of the seventh embodiment. Furthermore, as for $f_L$, $f_H$ and $f_{MG}$, adjustments are made to the structure, configuration and shape of the circular portion member of the vibrating element 30, as well as the rigidity, number and other factors of the spring bars 31, in order to achieve the relationship of formula (4).

The vibration response of a structure caused by excitation force can be calculated by superimposing the vibration responses of the individual natural modes of vibration. In the electro-magnetic excitation force, only the four-node circular mode of vibration is excited. Therefore, the vibration response of the stator 10 can be calculated by adding up the responses of four circular natural modes of vibration shown in FIGS. 36 to 39. A response in the circular natural mode of vibration is a result of multiplying the circular natural mode of vibration by response sensitivity, which is given as a function of the magnitude of the excitation force, natural frequency, excitation frequency and attenuation rate. The form of displacement corresponds to the natural mode of vibration. That is, all that is required to calculate the response of the stator 10 is to add up values obtained by multiplying each circular natural mode of vibration by a coefficient.

When the relationship of formula (4) is true, the vibration response of each mode can be regarded as the changes in shape shown in FIGS. 36 to 39. That is, in the first mode, the vibration response shown in FIG. 36 occurs in response to a low-order natural mode of vibration; the vibration response shown in FIG. 37 appears in response to a high-order natural mode of vibration. The displacement of the stator core 11 in a low-order mode is in the reverse-phase relationship to that in a high-order mode. The displacement of the circular member 35 in a low-order mode is in the in-phase relationship to that in a high-order mode. When the responses of the two circular modes of vibration are superimposed, the displacement of the stator core 11 decreases because the reverse-phase displacement is added. Therefore, as for the first mode, it is possible to curb the displacement of the stator core 11, which then becomes small.

Similarly, as for the response of the second mode, it is possible to make the displacement of the stator core 11 smaller.

As described above, according to the present embodiment, it is possible to achieve the same advantageous effects as in the seventh embodiment. Moreover, since one vibrating element 30 acts on two natural modes of vibration at the same time, it is possible to make the vibrating element 30 smaller.

Ninth Embodiment

Figure 40:
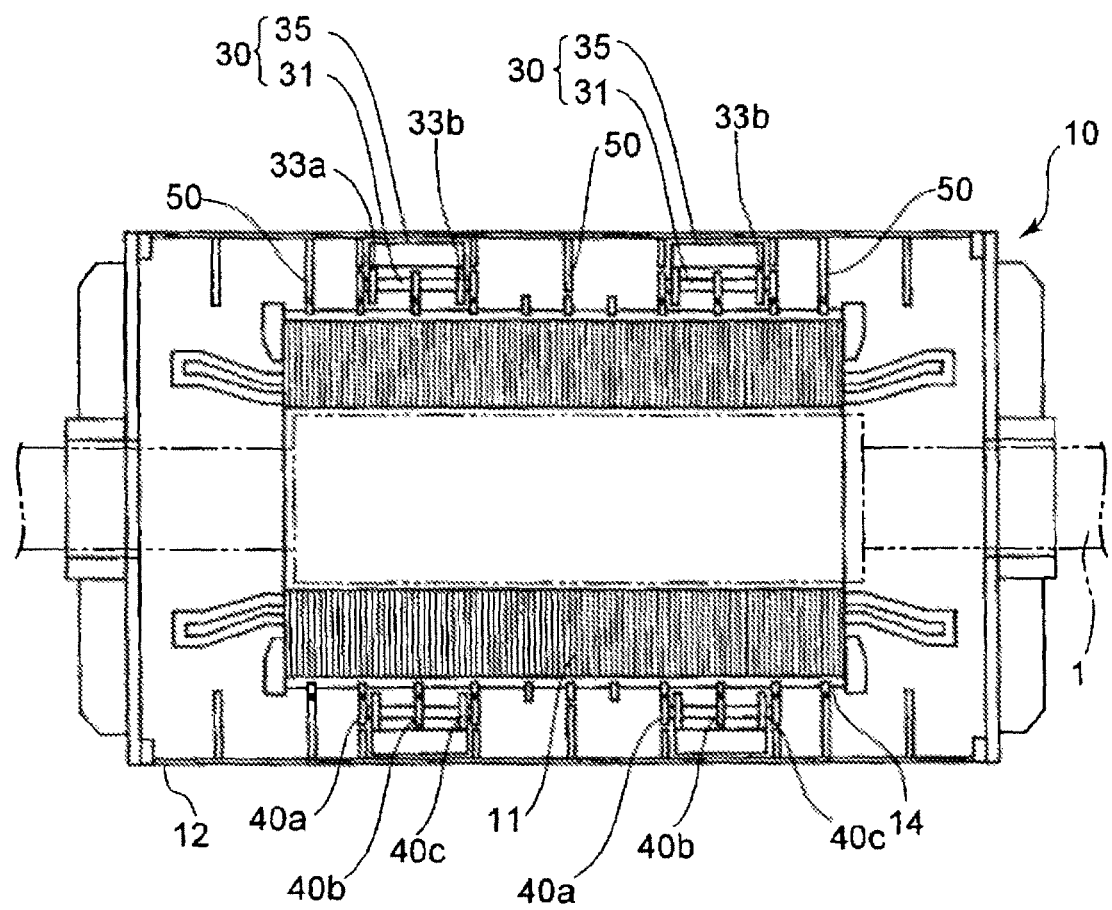
FIG. 40 is a schematic longitudinal cross-sectional view of a ninth embodiment of a rotating electrical machine of the present invention.
Figure 41:
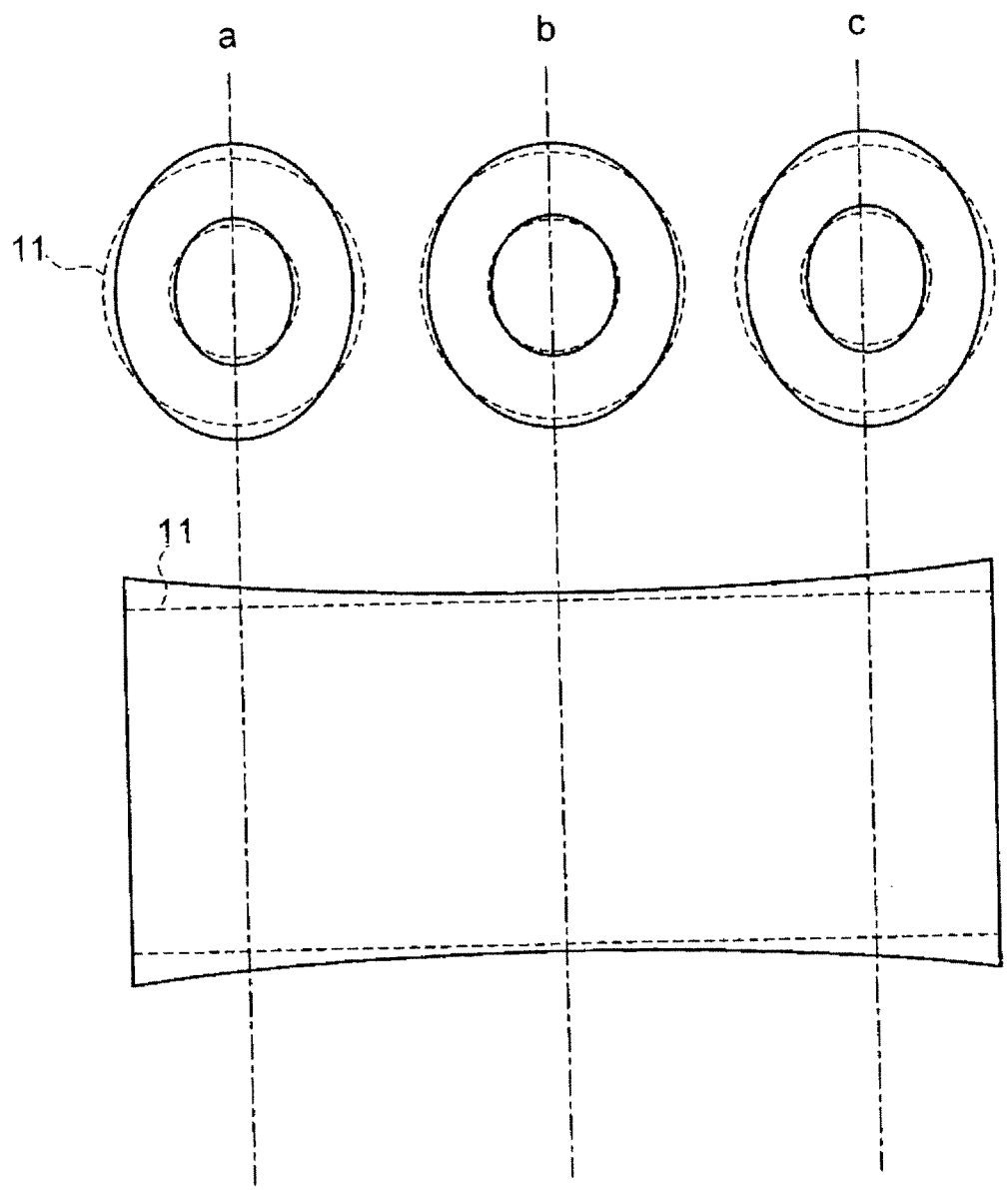
FIG. 41 is a model diagram schematically showing an axial-direction form of a first natural circular mode of vibration (first mode) of the stator core of the rotating electrical machine shown in FIG. 40.

A ninth embodiment of a rotating electrical machine of the present invention will be described with the use of FIGS. 40 and 41. FIG. 40 is a schematic longitudinal cross-sectional view of a rotating electrical machine of the present embodiment. FIG. 41 is a model diagram schematically showing an axial-direction form of a first natural circular mode of vibration (first mode) of the stator core 11 shown in FIG. 40. Incidentally, the present embodiment is an alternative example of the first embodiment (FIGS. 1 to 14). The portions that are the same as or similar to those of the first embodiment are represented by the same reference symbols and will not be described again.

In the rotating electrical machine of the present embodiment, two vibrating elements 30, which are the same as that described in the first embodiment, are disposed in the axial direction (FIG. 40).

The circular natural modes of vibration of the stator core 11 are different in axial-direction amplitude in some cases. As shown in FIG. 41, the amplitude at end portions (indicated by a and c in the diagram), which are free boundaries, is generally larger than at a central portion (indicated by b in the diagram) of the stator core 11. The vibrating element 30 is placed at a position where the amplitude of the stator core 11 is large. Therefore, the inertial force of the vibrating element 30 works more strongly. Thus, when compared with the case where the vibrating element 30 is placed at a central portion where the amplitude is small, the vibrating element 30 is more effective. Even when the vibrating element 30 is downsized, it is possible to achieve the same advantageous effects as in the first embodiment.

Tenth Embodiment

Figure 42:
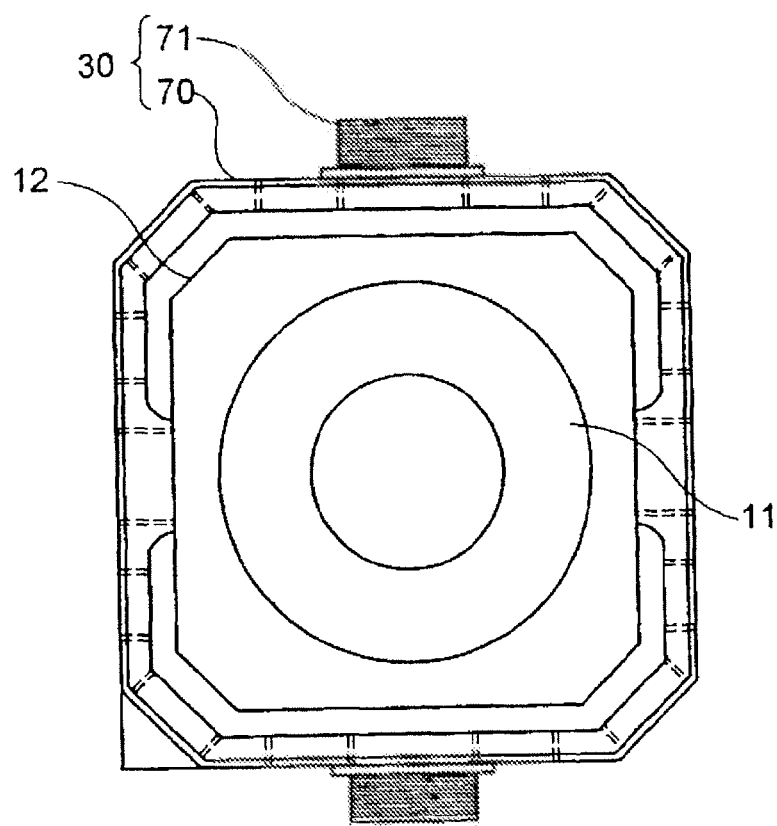
FIG. 42 is a schematic longitudinal cross-sectional view of a tenth embodiment of a rotating electrical machine of the present invention.
Figure 43:
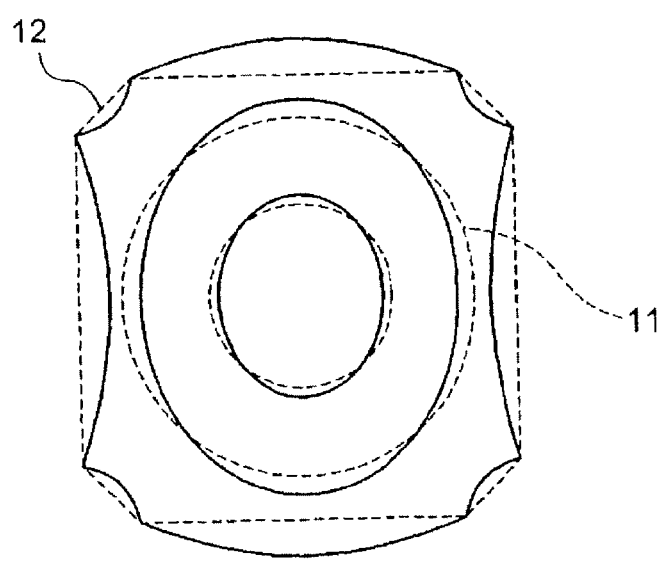
FIG. 43 is a model diagram schematically showing an outline of a natural mode of vibration in the stator frame shown in FIG. 42.
Figure 44:
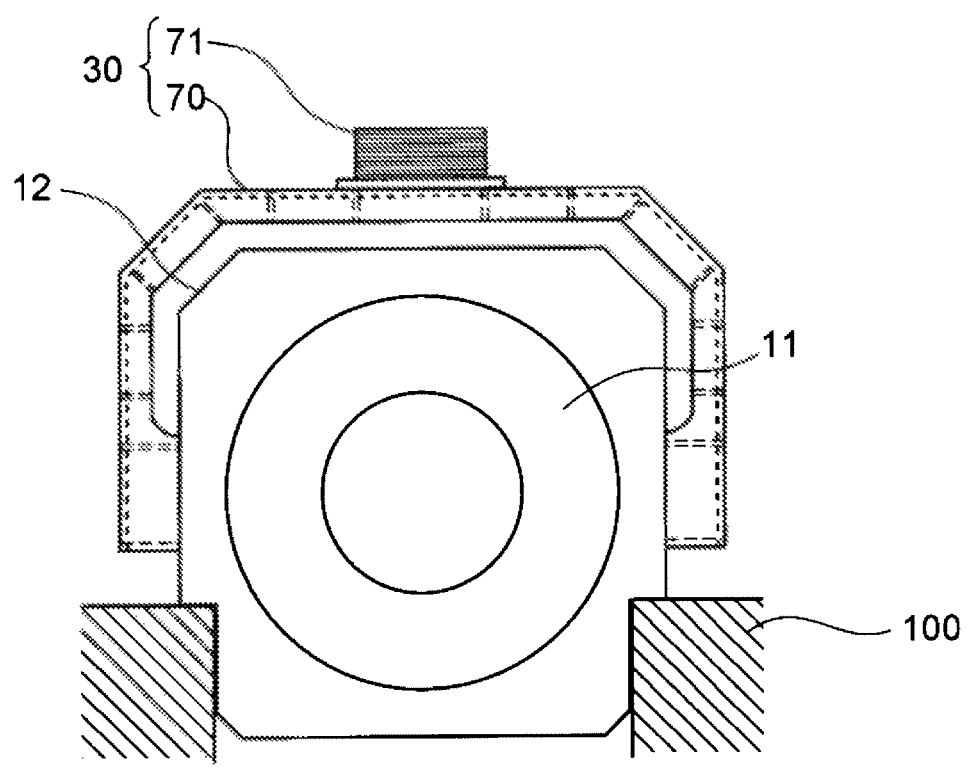
FIG. 44 is a schematic transverse cross-sectional view of an alternative example of the embodiment shown in FIG. 42.

A tenth embodiment of a rotating electrical machine of the present invention will be described with the use of FIGS. 42 to 44. FIG. 42 is a schematic transverse cross-sectional view of a rotating electrical machine of the present embodiment. Incidentally, in FIG. 42, the rotor 1 is not shown. FIG. 43 is a model diagram schematically showing an outline of a natural mode of vibration in the stator frame shown in FIG. 42. FIG. 44 is a schematic transverse cross-sectional view of an alternative example of the present embodiment.

Incidentally, the present embodiment is an alternative example of the fourth embodiment (FIGS. 19 to 21). The portions that are the same as or similar to those of the fourth embodiment are represented by the same reference symbols and will not be described again.

The stator frame 12 of the present embodiment is of a square type, with a cross-sectional surface substantially in the shape of a square.

On the outside of the stator frame 12, as shown in FIG. 42, a beam structural member 70 is provided: The beam structural member 70 is made for example by welding a steel sheet and is so formed as to go along the outer shape of the stator frame 12. When the stator frame 12 is of a square type, a circular mode of vibration occurs as indicated by solid line in FIG. 43. At portions where antinode portions of the circular mode of vibration of the stator frame 12 occur, i.e. at two locations of a vertical-direction position that is substantially the same as the rotating shaft, the beam structural member 70 and the stator frame 12 are connected together.

At antinode portions (in an upper area of FIG. 42) of the circular natural mode of vibration of the beam structural member 70, a cone 71, which is made up of stacked steel sheets, is placed. The cone 71 and the beam structural member 70 make up the vibrating element 30. At this time, adjustments are made to the number of steel sheets of the cone 71 and other factors in order for the natural frequency of the circular mode of vibration of the stator frame 12 to satisfy formula (4).

Even though not shown in the diagram, the stator core 11 is connected to the stator frame 12 at a position corresponding to a node portion of the second mode.

Since the beam structural member 70 of the vibrating element 30 is of a square type and formed so as to go along the outer shape of the square-type frame, the above can be used for a turbine generator having a square-type stator frame 12. Since the number of steel sheets of the cone 71 can be changed, it becomes easier to adjust the natural frequency of the vibrating element 30.

Incidentally, when a base 100 interferes, as shown in FIG. 44, a part of the vibrating element 30 below the connection portion can be omitted.

Other Embodiments

The foregoing description of the embodiments is given for illustrative purposes to describe the present invention and does not limit the inventions described in the appended claims. Regardless of the above embodiments, the configuration of each portion of the present invention may change in various forms within the technical scope described in the appended claims.

For example, according to the first to ninth embodiments, the spring bars 31 work as elastic members of the vibrating element 30. However, the elastic members are not limited to the above. It is possible to use an elastic member that can elastically deform in the radial direction. Moreover, it is possible to omit the spring bars 31. In this case, an elastic coefficient of the circular member 35 is an elastic coefficient of the vibrating element 30.

Moreover, the circular member 35 is the one integrally formed. However, the circular member 35 is not limited to the above. For example, the circular member 35 is made up of stacked circular discs.

What is claimed is:

1. A rotating electrical machine, comprising:
    a rotor that includes a rotating shaft, which rotates around a predetermined axis, and rotates together with the rotating shaft;
    a stator core that is substantially in a shape of a hollow cylinder, is made of a plurality of steel plates, which are substantially in a shape of a circular disc and stacked in an axial direction, and is disposed so as to surround an outer circumference of the rotor;
    a stator frame that is so formed as to cover the stator core from a radial-direction outside in such a way that predetermined radial-direction gaps are maintained on a side surface of the stator core;
    a circular member that is connected to the stator core only at first stator core connection portions,
    spring bars that are arranged so as to extend in the axial direction in such a way that predetermined radial-direction gaps are maintained on a side surface of the stator core, and are able to deform elastically in the radial direction; and
    spring bar connection members that the spring bars are attached to and which are connected to the first stator core connection portions at least at two locations, the spring bar connection members covering part of a side surface of the stator core in a circumferential direction from the radial-direction outside in such a way that predetermined radial-direction gaps are maintained on the side surface of the stator core, wherein:

the first stator core connection portions are formed at least at two locations on a side surface of the stator core, the locations being separated apart from each other in the circumferential direction, the circular member surrounds part of the side surface of the stator core in the circumferential direction from the radial-direction outside in such a way that predetermined radial-direction gaps are maintained on the side surface of the stator core, and is able to elastically deform at least in the radial direction, the circular member being disposed so as not to touch with the stator frame, when the circular member is not attached, vibration of the stator core includes: a first natural circular mode of vibration, in which amplitude spreads in the circumferential direction so that antinodes and nodes of vibration, a number of which is double a number of poles of the rotor, alternately appear substantially at regular intervals in the circumferential direction because of rotational electro-magnetic force excited by the rotor; and a second natural circular mode of vibration, in which amplitude spreads in the circumferential direction so that the second natural circular mode of vibration has substantially same natural frequency as a natural frequency corresponding to the first natural mode of vibration, nodes appear at locations corresponding to the antinodes of the first natural mode of vibration, and antinodes appear at locations corresponding to the nodes of the first natural circular mode of vibration;

the first stator core connection portions are formed adjacent to portions corresponding to the antinode portions of the first natural circular mode of vibration;

the circular member is connected to spring bar connection portions formed on the spring bars, the circular member covering the spring bars from the radial-direction outside in such a way that predetermined radial-direction gaps are maintained on the radial-direction outside of the spring bars:

the spring bars, along with the circular member, make one vibrating element;

an elastic property of the vibrating element contains an elastic property of the spring bars and an elastic property of the circular member; and the vibrating element is formed so that a third natural circular mode of vibration occurs in such a way that vibrations of antinodes spread in a direction opposite to the first natural circular mode of vibration, that when the circular member is attached, a mass and the elastic property of the vibrating element are set in such a way that a natural frequency of the first natural circular mode of vibration goes below an excitation frequency caused by electro-magnetic pull force of the rotor while a natural frequency of the third natural circular mode of vibration goes above an excitation frequency caused by electro-magnetic pull force of the rotor, and that a response of the first natural circular mode of vibration is canceled by a response of the third natural circular mode of vibration.

2. The rotating electrical machine according to claim 1, further comprising stator frame connection members that are connected to second stator core connection portions formed at least at two locations on the side surface of the stator core, the stator frame connection members covering part of the side surface of the stator core in the circumferential direction from the radial-direction outside in such a way that predetermined radial-direction gaps are maintained on the side surface, and are formed so that the radial-direction outside is connected to an inner circumference surface of the stator frame, wherein the second stator core connection portions contain a position adjacent to a node portion of a second circular mode of vibration of the stator core, in which antinodes and nodes of vibration alternately appear in the circumferential direction as the circular member is attached to the first stator core connection portions.

3. The rotating electrical machine according to claim 1, wherein:

the first stator core connection portions are formed adjacent to portions corresponding to antinode portions of the individual first and second natural circular modes of vibration;

the vibrating element is formed so that the third natural circular mode of vibration occurs in such a way that vibrations of antinodes spread in a direction opposite to the first natural circular mode of vibration, that when the circular member is attached, the mass and the elastic property of the vibrating element are set in such a way that a natural frequency of the first natural circular mode of vibration goes below an excitation frequency caused by electro-magnetic pull force of the rotor while a natural frequency of the third natural circular mode of vibration goes above the excitation frequency caused by electro-magnetic pull force of the rotor, and that a response of the first natural circular mode of vibration is canceled by a response of the third natural circular mode of vibration; and the vibrating element is formed so that a fourth natural circular mode of vibration occurs in such a way that vibrations of antinodes spread in a direction opposite to the second natural circular mode of vibration, that when the circular member is attached, the mass and elastic property of the vibrating element are set in such a way that a natural frequency of the second natural circular mode of vibration goes below an excitation frequency caused by electro-magnetic pull force of the rotor while a natural frequency of the fourth natural circular mode of vibration goes above the excitation frequency caused by electro-magnetic pull force of the rotor, and that a response of the second natural circular mode of vibration is canceled by a response of the fourth natural circular mode of vibration.

4. The rotating electrical machine according to claim 1, wherein a plurality of the vibrating elements are disposed so as to be spaced out from each other in the axial direction.

5. The rotating electrical machine according to claim 1, wherein:

a plurality of the vibrating elements are arranged so as to be spaced out from each other in the axial direction; and the spring bars of the individual vibrating elements that are positioned adjacent to each other in the axial direction are so formed that axial-direction end portions facing each other of the individual spring bars are connected to the same spring bar connection members.

* * * * *